US008941888B2

(12) United States Patent
Bloomfield

(10) Patent No.: US 8,941,888 B2
(45) Date of Patent: *Jan. 27, 2015

(54) FACSIMILE TO E-MAIL COMMUNICATION SYSTEM WITH LOCAL INTERFACE

(71) Applicant: Antopholi Software, LLC, Wilmington, DE (US)

(72) Inventor: Mark C. Bloomfield, Marietta, GA (US)

(73) Assignee: Antopholi Software, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,403

(22) Filed: Jul. 12, 2013

(65) Prior Publication Data

US 2013/0301084 A1 Nov. 14, 2013

Related U.S. Application Data

(63) Continuation of application No. 13/457,408, filed on Apr. 26, 2012, now Pat. No. 8,488,207, which is a continuation of application No. 12/207,921, filed on Sep. 10, 2008, now abandoned, which is a continuation (Continued)

(51) Int. Cl.
*H04N 1/04* (2006.01)
*H04N 1/32* (2006.01)
(Continued)

(52) U.S. Cl.
CPC ............ *H04N 1/32406* (2013.01); *H04L 12/58* (2013.01); *H04L 12/5835* (2013.01);
(Continued)

(58) Field of Classification Search
USPC ................................. 358/407, 442, 468, 440
See application file for complete search history.

(56) References Cited

U.S. PATENT DOCUMENTS 3,518,553 A 6/1970 Ho et al.
3,594,495 A 7/1971 Bond
(Continued)

FOREIGN PATENT DOCUMENTS

CA 1111923 A1 11/1981
CA 2507227 4/1998
(Continued)

OTHER PUBLICATIONS

United States Patent and Trademark Office, Non-Final Office Action, U.S. Appl. No. 09/723,349, mailed May 9, 2003, 26 pages.
(Continued)

*Primary Examiner* — Houshang Safaipour
(74) *Attorney, Agent, or Firm* — Perkins Coie LLP

(57) ABSTRACT

A fax to E-mail system and related method are shown, whereby a hardcopy document is sent via a fax device to its recipient via electronic mail through a data network, and is delivered in such a manner that it can be retrieved by the recipient at an E-mail device and displayed on the screen of the E-mail device. The document begins as a hardcopy, as an electronic file retrieved through E-mail recipient's terminal and displayed on the computer screen of the E-mail recipient's terminal. The system and method also provides for an interface device which connects to a conventional fax device for communicating E-mail addresses and routing hardcopy documents to the E-mail network, and provides a means for embedding the functions of the interface device into conventional fax devices. The system can also be used in cooperation with Internet Web service for reporting, accounting, information services, and user interaction.

19 Claims, 19 Drawing Sheets

Related U.S. Application Data of application No. 10/795,655, filed on Mar. 8, 2004, now Pat. No. 7,446,906, which is a continuation of application No. 09/717,193, filed on Nov. 21, 2000, now Pat. No. 6,707,580, which is a continuation of application No. 09/235,566, filed on Jan. 22, 1999, now Pat. No. 6,693,729, which is a continuation-in-part of application No. 08/915,196, filed on Aug. 20, 1997, now Pat. No. 6,025,931, and a continuation-in-part of application No. 08/839,655, filed on Apr. 15, 1997, now abandoned, and a continuation-in-part of application No. PCT/IB97/01455, filed on Oct. 7, 1997.

(60) Provisional application No. 60/048,064, filed on May 30, 1997, provisional application No. 60/028,405, filed on Oct. 15, 1996.

(51) Int. Cl.
*H04L 12/58* (2006.01)
*H04N 1/00* (2006.01)
*H04N 1/333* (2006.01)
*H04M 7/00* (2006.01)

(52) U.S. Cl.
CPC .......... *H04L51/066* (2013.01); *H04N 1/00204* (2013.01); *H04N 1/00209* (2013.01); *H04N 1/00212* (2013.01); *H04N 1/00312* (2013.01); *H04N 1/33392* (2013.01); *H04M 7/006* (2013.01); *H04N 2201/0068* (2013.01); *H04N 2201/0086* (2013.01); *H04N 2201/0093* (2013.01)
USPC ............ 358/407; 358/442; 358/468; 358/440

(56) References Cited

U.S. PATENT DOCUMENTS

| | | |
|---|---|---|
| 3,760,171 A | 9/1973 | Wang et al. |
| 3,812,945 A | 5/1974 | Koplow et al. |
| 3,913,721 A | 10/1975 | Koplow et al. |
| 3,958,088 A | 5/1976 | Vieri |
| 4,137,491 A | 1/1979 | Bartley et al. |
| 4,145,739 A | 3/1979 | Dunning et al. |
| 4,198,677 A | 4/1980 | Brunner et al. |
| 4,207,598 A | 6/1980 | Reich et al. |
| 4,506,111 A | 3/1985 | Takenouchi et al. |
| 4,524,393 A | 6/1985 | Ohzeki |
| 4,573,140 A | 2/1986 | Szeto |
| 4,582,957 A | 4/1986 | Hayes et al. |
| 4,586,086 A | 4/1986 | Ohzeki |
| 4,607,289 A | 8/1986 | Kurokawa |
| 4,613,907 A | 9/1986 | Yoshimoto et al. |
| 4,630,196 A | 12/1986 | Bednar, Jr. et al. |
| 4,638,118 A | 1/1987 | Wang et al. |
| 4,713,780 A | 12/1987 | Schultz et al. |
| 4,716,544 A | 12/1987 | Bartley |
| 4,763,191 A | 8/1988 | Gordon et al. |
| 4,785,473 A | 11/1988 | Pfeiffer et al. |
| 4,827,085 A | 5/1989 | Yaniv et al. |
| 4,837,798 A | 6/1989 | Cohen et al. |
| 4,868,860 A | 9/1989 | Andros et al. |
| 4,902,881 A | 2/1990 | Janku |
| 4,918,722 A | 4/1990 | Duehren et al. |
| 4,941,170 A | 7/1990 | Herbst |
| 4,970,603 A | 11/1990 | Kanai |
| 5,008,835 A | 4/1991 | Jachmann et al. |
| 5,014,300 A | 5/1991 | Harvath et al. |
| 5,033,079 A | 7/1991 | Catron et al. |
| 5,062,076 A | 10/1991 | Ho et al. |
| 5,065,254 A | 11/1991 | Hishida |
| 5,091,790 A | 2/1992 | Silverberg |
| 5,115,326 A | 5/1992 | Burgess et al. |
| 5,136,634 A | 8/1992 | Rae et al. |
| 5,175,684 A | 12/1992 | Chong |
| 5,193,110 A | 3/1993 | Jones et al. |
| 5,200,993 A | 4/1993 | Wheeler et al. |
| 5,204,757 A | 4/1993 | Agudelo et al. |
| 5,247,591 A | 9/1993 | Baran |
| 5,287,199 A | 2/1994 | Zoccolillo |
| 5,291,302 A | 3/1994 | Gordon et al. |
| 5,291,546 A | 3/1994 | Giler et al. |
| 5,299,255 A | 3/1994 | Iwaki et al. |
| 5,317,628 A | 5/1994 | Misholi et al. |
| 5,333,266 A | 7/1994 | Boaz et al. |
| 5,339,156 A | 8/1994 | Ishii |
| 5,377,017 A | 12/1994 | Lam |
| 5,384,835 A | 1/1995 | Wheeler et al. |
| 5,386,297 A | 1/1995 | Tanaka et al. |
| 5,406,557 A | 4/1995 | Baudoin |
| 5,410,416 A | 4/1995 | Amberg et al. |
| 5,438,611 A | 8/1995 | Campana, Jr. et al. |
| 5,452,099 A | 9/1995 | Von Meister |
| 5,461,488 A | 10/1995 | Witek |
| 5,488,651 A | 1/1996 | Giler et al. |
| 5,508,817 A | 4/1996 | Kunigami |
| 5,548,789 A | 8/1996 | Nakanura |
| 5,555,100 A | 9/1996 | Bloomfield et al. |
| 5,559,611 A | 9/1996 | Bloomfield et al. |
| 5,559,721 A | 9/1996 | Ishii |
| 5,608,786 A | 3/1997 | Gordon |
| 5,631,946 A | 5/1997 | Campana, Jr. et al. |
| 5,675,507 A | 10/1997 | Bobo, II |
| 5,712,907 A | 1/1998 | Wegner et al. |
| 5,739,850 A | 4/1998 | Hori |
| 5,748,484 A | 5/1998 | Cannon et al. |
| 5,767,985 A | 6/1998 | Yamamoto et al. |
| 5,768,347 A | 6/1998 | Beyda |
| 5,777,754 A | 7/1998 | Gavan |
| 5,802,314 A | 9/1998 | Tullis et al. |
| 5,805,298 A * | 9/1998 | Ho et al. ....................... 358/402 |
| 5,809,121 A | 9/1998 | Elliott et al. |
| 5,835,087 A | 11/1998 | Herz et al. |
| 5,838,461 A | 11/1998 | Hsieh |
| 5,838,821 A | 11/1998 | Matsubara et al. |
| 5,848,397 A | 12/1998 | Marsh et al. |
| 5,859,967 A | 1/1999 | Kaufeld et al. |
| 5,872,845 A | 2/1999 | Feder |
| 5,881,064 A | 3/1999 | Lin et al. |
| 5,940,187 A | 8/1999 | Berke |
| 5,974,449 A | 10/1999 | Chang et al. |
| 5,999,274 A | 12/1999 | Lee et al. |
| 6,020,980 A | 2/2000 | Freeman |
| 6,023,345 A | 2/2000 | Bloomfield |
| 6,025,931 A | 2/2000 | Bloomfield |
| 6,028,679 A | 2/2000 | Murphy |
| 6,061,502 A | 5/2000 | Ho et al. |
| 6,073,164 A | 6/2000 | Zey |
| 6,101,397 A | 8/2000 | Grob et al. |
| 6,141,695 A | 10/2000 | Sekiguchi et al. |
| 6,195,686 B1 | 2/2001 | Moon et al. |
| 6,211,972 B1 | 4/2001 | Okutomi et al. |
| 6,320,677 B1 | 11/2001 | Yoon |
| 6,321,194 B1 | 11/2001 | Berestesky |
| 6,424,426 B1 | 7/2002 | Henry |
| 6,493,022 B1 | 12/2002 | Ho et al. |
| 6,590,677 B1 | 7/2003 | Nakamura et al. |
| 6,625,642 B1 | 9/2003 | Naylor et al. |
| 6,690,480 B2 | 2/2004 | Maeda |
| 6,693,729 B1 | 2/2004 | Bloomfield |
| 6,707,580 B1 * | 3/2004 | Bloomfield ................... 358/402 |
| 6,857,007 B1 | 2/2005 | Bloomfield |
| 6,892,239 B1 | 5/2005 | Kirkeby |
| 6,920,143 B1 | 7/2005 | Ortiz et al. |
| 6,963,634 B2 | 11/2005 | Toyoda et al. |
| RE38,908 E | 12/2005 | Ho et al. |
| 6,999,565 B1 | 2/2006 | Delaney et al. |
| 7,019,853 B1 | 3/2006 | Maeda |
| 7,177,909 B2 | 2/2007 | Stark et al. |
| 7,446,906 B2 * | 11/2008 | Bloomfield ................... 358/407 |
| 7,895,313 B2 | 2/2011 | Bobo, II |
| 7,898,675 B1 | 3/2011 | Murphy |

(56) References Cited

U.S. PATENT DOCUMENTS

| | | |
|---|---|---|
| 8,224,909 B2 | 7/2012 | Bloomfield |
| 8,488,207 B2 | 7/2013 | Bloomfield |
| 2001/0000441 A1 | 4/2001 | Zinkov et al. |
| 2002/0019851 A1 | 2/2002 | Pollack |
| 2002/0059389 A1 | 5/2002 | Toyoda et al. |
| 2002/0062363 A1 | 5/2002 | Naylor et al. |
| 2002/0087648 A1 | 7/2002 | Petrovykh |
| 2004/0073709 A1 | 4/2004 | Bloomfield |
| 2004/0100648 A1 | 5/2004 | Kulakowski |
| 2005/0012965 A1 | 1/2005 | Bloomfield |
| 2006/0179112 A1 | 8/2006 | Weyer et al. |
| 2007/0236732 A1 | 10/2007 | Henry |
| 2009/0021796 A1 | 1/2009 | Bloomfield |
| 2011/0242606 A1 | 10/2011 | Bloomfield |
| 2012/0243053 A1 | 9/2012 | Bloomfield |

FOREIGN PATENT DOCUMENTS

| | | | |
|---|---|---|---|
| CA | 2268333 | 11/2005 | |
| EP | 0402809 A2 | 12/1990 | |
| EP | 0465011 A2 | 1/1992 | |
| EP | 0504884 A2 | 9/1992 | |
| EP | 0615 377 A2 * | 3/1994 | ............... H04N 1/32 |
| EP | 0615377 A2 | 9/1994 | |
| EP | 0850532 | 4/2002 | |
| GB | 2185361 A | 7/1987 | |
| GB | 1493897 A | 11/1997 | |
| JP | 5447504 A | 4/1979 | |
| JP | 5840949 A | 3/1983 | |
| JP | 58165452 A | 9/1983 | |
| JP | 60134656 A | 7/1985 | |
| JP | 61260741 A | 11/1986 | |
| JP | 62141849 A | 6/1987 | |
| JP | 6412856 | 1/1989 | |
| JP | 6458160 | 3/1989 | |
| JP | 6473942 | 3/1989 | |
| JP | 1112856 A | 5/1989 | |
| JP | 58160 | 1/1993 | |
| JP | 6113727 A | 4/1994 | |
| JP | 83942 | 1/1996 | |
| JP | 1998063759 | 3/1998 | |
| WO | WO-9641463 A1 | 12/1996 | |
| WO | WO-9710668 A1 | 3/1997 | |
| WO | WO-9817041 A2 | 4/1998 | |
| WO | WO-0219692 | 3/2002 | |

OTHER PUBLICATIONS

United States Patent and Trademark Office, Final Office Action, U.S. Appl. No. 09/723,349, mailed Jun. 18, 2004, 29 pages.
United States Patent and Trademark Office, Notice of Allowance, U.S. Appl. No. 09/723,349, mailed Oct. 6, 2004, 7 pages.
United States Patent and Trademark Office, Non-Final Office Action, U.S. Appl. No. 10/681,562, mailed Aug. 9, 2007, 15 pages.
United States Patent and Trademark Office, Final Office Action, U.S. Appl. No. 10/681,562, mailed Jan. 24, 2008, 15 pages.
United States Patent and Trademark Office, Non-Final Office Action, U.S. Appl. No. 12/369,785, mailed Aug. 31, 2011, 12 pages.
United States Patent and Trademark Office, Notice of Allowance, U.S. Appl. No. 12/369,785, mailed Mar. 2, 2012, 16 pages.
United States Patent and Trademark Office, Non-Final Office Action, U.S. Appl. No. 13/490,403, mailed Oct. 30, 2012, 11 pages.
United States Patent and Trademark Office, Notice of Allowance, U.S. Appl. No. 13/490,403, mailed Apr. 9, 2013, 11 pages.
International Searching Authority, International Search Report, PCT Application PCT/US2001/023402, mailed Nov. 8, 2001, 3 pages.
International Bureau, Preliminary Examination Report, PCT Application PCT/US2001/023402, completed Oct. 17, 2003, 10 pages.
Kamae, T., "Development of Public Facsimile Communication System Using Storage and Conversion Techniques", IEEE 1980, pp. 19.4.1-19.4.5.
1-Line Worldwide, Inc., "Fax-4-Less Infrastructure Guidelines", Jun. 4, 1996, 7 pages.
Cheyenne InfoFax, FaxServe Product Information, pp. 1-15, prior to May 30, 1997.
Yahoo Finance Business Wire, "Centigram and Lucent deploy VPIM protocol for exchanging voice and fax messages over the Internet", Apr. 23, 1997, 2 pages.
"Fax2Net Sends Faxes over the Internet", Fax Focus Newsletter, vol. 17, Issue 21, Jun. 10, 1997, 2 pages.
"Fabrik Fax, an E-Mail-To-Fax Service", Fax Focus Newsletter, vol. 17, Issue 21, Jun. 10, 1997, 2 pages.
Lumina News, "Lumina Office Products Introduces Internet Fax Software—Internet Fax Utility Offers Simplified Faxing to E-Mail Addresses", Sep. 3, 1996, 2 pages.
Biscom Introduces the e-fax Machine, the E-mail/Facsimile Solution "For the rest of us", Sep. 19, 1996, 2 pages.
ScanFX—Scanning Hardware for Internet E-Mail, Our Business Machine, Inc.'s Editorial Resource Chest, Irwindale, CA, Aug. 1996, 2 pages.
F@x Mate, "Fax to E-mail Service: The Basics", prior to Sep. 18, 1997, 2 pages.
AT&T Introduces Most Comprehensive Fax-To-Data Service, Feb. 22, 1996, 2 pages.
TAC Systems, Inc., FaxFree Portal 100, Fax Machine Internet Interface, 1997, 3 pages.
Biscom, Inc., "The Messaging Machine, the 'e-fax' Model", prior to Nov. 1996, 2 pages.
JFax Personal Telecom, Extra Press Extra, "What the media says about JFAX Personal Telecom", retrieved on Oct. 31, 1996, 2 pages.
JFax Personal Telecom, Plug a Phone Into Your E-Mail, "Get all your Voice-Mail and Faxes in your E-Mail", copyright 1996, pp. 1-3.
JFax Personal Telecom, Frequently Asked Questions, Oct. 31, 1996, 3 pages.
IBM Announcement Letters (US), Document 295, Microsoft Internet Explorer, Nov. 12, 1996, 22 pages.
Sreenivasan, Sreenath, "German Pop Singer Sets Sights on Virtual Office", The New York Times Cyber Times, Sep. 23, 1996, pp. 1-3.
DigitalNote Fax2Net R5S1, Microsoft Internet Explorer, "How to Get Started with Net2Fax", Oct. 31, 1996, p. 2 of 4.
DigitalNote Fax2Net R5S1, "A Beginner's Guide to Digital Mail Fax2Net", copyright 1995, pp. 1-10.
IBM, "How to Set Up Your DirectTalkMail Box", Nov. 12, 1996, 1 page.
IBM Link/InfoLink, "IBM Software Allows Phone Messages to Be Retrieved Via Internet World Wide Web", Nov. 28, 1995, 2 pages.
Nigel Ballard @ The Paperless Office, JFAX Personal Telecom main page, Jun. 26, 1996, pp. 1-2.
FaxWeb, Microsoft Internet Explorer, FaxWeb Viewer copyright 1996, Netoffice Solutions, LLC, Nov. 12, 1996, 1 page.
Patel, Sanjiv P., et al. "The Multimedia Fax-MIME Gateway." IEEE Multimedia Winter 1994, pp. 64-70.
"First Global Fax and Voice to E-Mail Network Launched for Internet Users". JFAX Press Information, Apr. 30, 1996, pp. 1-2.
Timura, J., et al., "Studies on Present and Future Public Data Network Services in Japan", Teleinformatics 79, 1979, pp. 293-299.
Sheffield, B., "Office Automation in Practice", *Data Processing* vol. 27, No. 2, Butterworth & Co. (Publishers) Ltd. Mar. 1985, pp. 18-20.
Nordin, G., et al., "Introduction of a Store and Forward Facility in the Swedish Telex Network", ISS '81 CIC, Montreal, Sep. 21-25, 1981, 7 pages.
Elston, S., Distribution 1, EDI Experiences '88, Lowfield Distribution Ltd., 1988, pp. 186-188.
Bransby, M., "Voice Mail Makes a Difference", *The Journal of Business Strategy*, Jan./Feb. 1990, pp. 7-10.
Hewer, J.M., "What's new in fax?", *CMA Magazine*, vol. 64, Issue 10, Dec. 1990/Jan. 1991, pp. 21-22.
Miki, T., "KDD's Facsimile Interworking and X.400 Interconnection", IFIP 1991, pp. 123-134.
Canadian Intellectual Property Office, Office Action, Application 2,507,227, dated May 29, 2007, 4 pages.
United States Bankruptcy Court, Northern District of California, In Re Oaz Communications, Inc., Case No. 91-40335T, Notice of Motion for Final Order Authorizing Secured Accounts Receivable Financing Agreement, on Jul. 25, 1991, 1 page.

(56) References Cited

OTHER PUBLICATIONS

Fiore, Dave, Fax Revised License Agreement, May 5, 1991, 8 pages.
OAZ Communications, Inc., "Introducing NetFax Manager", *PC Week*, Jul. 9, 1990, p. 52.
Kondamorri, Pratap S., Letter re Acct. No. PRA001, May 29, 1991, 1 page.
Murphy, Jeff, Cover Letter and Statement re Acct. No. PRA001, May 9, 1991, 2 pages.
Paradox Development Corp., Invoice 14209, Apr. 30, 1990, 1 page.
Fleming, Bill, "Link Your Workgroup to the World With Electronic Mail", Mar. 15, 1991, 3 pages.
Paradox Development Corp., MHS, 1988, 1 page.
Kramer, Matt, "Lan Fax Gateways", *PC Week*, 1989, p. 21.
Land, Kris, U.S. Bankruptcy Court, Northern District of California, Proof of Claim, May 21, 1991, Case No. 91-40335T, 1 page.
Paradox Development Corp., Para-Mail User's Manual, Version 2.16, Jul. 6, 1990, 476 pages.
OAZ Communications, Exhibitors, Network 90 Dallas, 1990, p. 122.
Fiore, Dave, Letter re two original license agreements, May 29, 1991, 1 page.
Adams & West, e-mail exchange re: dl-mhs NetWare, Feb. 5-6, 1992, 1 page.
Product Focus, *Lantimes*, Dec. 1988, pp. 35-38.
oaz.lt13, Jul. 3, 1991, Communication re NFUser License Agreement, 1 page.
oaz.lt10, May 10, 1991, Communication to U.S. Bankruptcy Court re Oaz case, 1 page.
oaz.lt9, Mar. 19, 1991, Communication to U.S. Bankruptcy Court re Oaz case, 1 page.
oaz.lt5, Feb. 21, 1991, Communication re New Letter of Agreement, pp. 1-2.
oaz.lt8, Feb. 21, 1991, Communication from Kris Land re Oaz Chapter 11, 1 page.
oaz.lt6, Feb. 1, 1991, Communication re NetFax Server Software Purchase Agreement, 1 page.
oaz.lt4, Jan. 21, 1991, Communication re NFUser Termination Notice, pp. 1-2.
oaz.lt2, Oct. 18, 1990, Communication re nonconformance, pp. 1-2.
oaz.lt1, Oct. 2, 1990, Communication re relationship, 1 page.
oazsales.rpt, Aug. 9, 1990, Communication re Sales Effort Report, 1 page.
Thompson, M. Keith, "Para-Mail", *PC Magazine*, Nov. 27, 1990, vol. 9, No. 20, p. 297.
Paradox Development Corp. and Oaz Communications, Inc., Licensing and Professional Services Agreement, May 29, 1991, 11 pages.
Letter re NFUser License Agreement—Development and Modification, Jun. 20, 1991, 1 page.
Paradox Development Corp., Statement on Account OAZ001, Jun. 28, 1991, 1 page.
Letter re NFUser License Agreement—Development & Modification, Jul. 3, 1991, 2 pages.
Comverse/Ascom, "Ascom Group and Comverse announce formation of strategic marketing relationship and $6 million equity investment", *Business Wire*, Aug. 17, 1989, pp. 1-2.
Van Kampen, H., "Interconnection of the Teletex-, Telex- and Other Services", International Switching Symposium, Montreal, Sep. 21-25, 1981, 5 pages.
Shimoda, Minoru et al., "Enhanced Facsimile Data Conversion and Interface Control Equipment in FICS", *Electrical Communications Laboratories Technical Journal*, Japan, vol. 34, No. 10, 1985, pp. 1393-1402.
Intellectual Property Office Philippines, Office Action for Application No. 11999000809, Sep. 1, 2006, 3 pages.
Postel, J., "Summary of Computer Mail Services Meeting Held at BBN on Jan. 10, 1979", Mar. 1, 1982, printed from Internet on Jan. 11, 2006, 8 pages.
Chang, Tawei, "UCL Facsimile System", Feb. 1982, printed from Internet on Jan. 11, 2006, pp. 1-100.
The Gale Group, "GammaLink Announces PC-To-Facsimile Communications", Nov. 18, 1985, *PR Newswire*, USA, 2 pages.

The Gale Group News Release, "Direct PC-To-Remote-Facsimile Communications Package Allows Fast, Low-Cost Transmission of Documents", Sep. 15, 1986, 1 page.
International Technology Disclosures, vol. 6, No. 5, May 25, 1988, 4 pages.
Cantata Technology, Inc., "The Future of Electronic Messaging", print version of Cantata Technology web page: www.Cantata.com/support/productinfo.cfm, printed Jul. 16, 2007, 2006 copyright, 8 pages.
DID word definition from Webopedia Computer Dictionary, printed on Jul. 16, 2007, 4 pages.
Matsushita Graphic Communication Systems, Inc., Panasonic Facsimile Operating Instructions Model No. UR-590, 2001 copyright, dated Jan. 2002 on back, 158 pages.
Matsushita Graphic Communication Systems, Inc., Facsimile Panafax UF-585/595 User's Guide, 1999 copyright, 176 pages.
"Setting Up Your Machine", date unknown, pp. 14-25.
Matsushita Graphic Communication Systems, Inc., How to Use Your Panafax UF-250, includes two copyright notices (1987 & 1988), 51 pages.
Postel, J., "Rapicon 450 Facsimile File Format", Sep. 28, 1980, printed on Jun. 2, 2006, http://www.scit.w/v.ac.uk/rfc/rfc7xx/RFC769.html, 3 pages.
Communication from Erie Cheung to Jack Neurauter re specification for Voice Interface Processor, Aug. 30, 1991, 3 pages.
United States Patent and Trademark Office, Office Action in U.S. Appl. No. 10/681,562, mailed Aug. 9, 2007, 15 pages.
Share Communications, Inc., FaxShare User's Guide, Nov. 1989, 146 pages.
Share Communications, Inc., Why Faxshare?, 1990, 2 pages.
Shore, Joel, FaxShare NLM for NetWare 386 debuts, Computer Reseller News, Mar. 19, 1990, p. 54.
The Pan Network, "Don't call us . . . We'll call you", MIX, Mar. 1990, p. 133.
Molsa, Terhi, "Telecommuting and the International Educator", *The Advising Quarterly*, No. 26, Fall 1993, pp. 1-40.
Register, Pam, "Fax has area man humming new tune", *Business The Reporter*, Aug. 28, 1989, 2 pages.
The PAN Network, Sending & Receiving FAX thru Email, alt.fax, Jun. 11, 1991, 1 page.
Gamma Technology, Inc. DBA Gammalink, Invoice 2585, Dec. 15, 1987, 1 page.
Facsimile, Jun. 9, 1988, 1 page.
The PAN Network, "Next time you're not at home . . . Give us a call", MIX, Jul. 1990, p. 35.
Leopold, Perry, and Teresa Jackson, Facsimile re initial software release, Aug. 1990, 3 pages.
Leopold, Perry, Letter to Music Week Publisher, Feb. 16, 1998, 1 page.
Leadley, Simon, "Modems, bits and pieces", *Sonics The Music Magazine*, Jul./Aug. 1989, cover and p. 46.
The PAN Network, "Don't call us . . . We'll call you", *Keyboard*, May 1990, p. 35.
PAN FaxMail Rate Schedule for Dedicated Service, Jul. 12, 1989, 1 page.
"1-900-MIDI: Dealers Keep Pace With PC Networks", *Music & Sound Retailer*, Jan. 1989, 2 pages.
Newton, F. Roger, IAAM Event Fax to Perry Leopold, Feb. 19, 1990, 1 page.
Gamma Technology, Inc. DBA Gammalink, Invoice 4069, Oct. 12, 1988, 1 page.
PAN FaxMail Rate Schedule, Sep. 15, 1990, 1 page.
The PAN Network Rates & Fees, May 1992, 1 page.
Dialogic Corporation, Invoice 6174, Aug. 2, 1988, 1 page.
Newton, F. Roger, "Fax It!! Can we share the event facts by Fax?", *Facility Manager*, Winter 1989-1990, p. 44.
Dialogic Corporation, Invoice 6570, Sep. 12, 1988, 1 page.
Weber Associates, The Pan Network Marketing Plan Proposal, Nov. 20, 2989, 3 pages.
Dembicki, Dan, Cancellation Request to The PAN Networks, Jun. 1988, 1 page.
The PAN Network, *PAN Hard Copy*, Winter 1990, vol. 7, No. 1, 2 pages.

(56) References Cited

OTHER PUBLICATIONS

Dialogic Corporation, Invoice 6621, Sep. 19, 1988, 1 page.
Dialogic Corporation, Letter to Pan Networks Accounts Payable, Jul. 13, 1987, 1 page.
The PAN Network, *PAN Hard Copy*, Winter 1990, vol. 7, No. 1, 3 pages.
Werner, Tom, "Just the fax, Ma'am, just the fax—but everywhere", *Philadelphia Business Journal*, Oct. 30-Nov. 5, 1989, 1 page.
Store-and-forward fax service debuts, *Network World*, Jul. 17, 1989, p. 27.
American Arbitration Association, *Leopold v. Delphi*, Transcript Excerpts from Perry Leopold Deposition, Aug. 11, 1997, pp. 146-151.
Hass, Nancy. "Hooding Up a Sound Idea Music Network Was Montco Singer's Brainchild." Aug. 1989, 2 pages.
New # for TSN & PEP Fax, Nov. 6, 1989, 1 page.
Pan System/2 Command Card, 1988, 4 pages.
*The Advising Quarterly for Professionals in International Education*, vol. 26, Fall 1993, pp. 1-40.
Oaz Communications, NetFAX From Oaz, 1989, 9 pages.
Fiore, Dave, Letter to Paradox Development Corporation re prepayment and work on NFUser, Jun. 6, 1991, 2 pages.
Land, Kris, Letter to Dave Fiore at Oaz Communications, Jun. 7, 1991 sent via FedEx, 1 page.
United States Bankruptcy Court, Northern District of California, In Re Oaz Communications, Inc., Case No. 91-40335T, Notice of Debtor's Application for Order Approving Employment and Compensation of Houlihan Lokey Howard & Zukin, Jun. 10, 1991, 1 page.
Paradox Development Corporation, Business Plan, Aug. 5, 1990, 43 pages.
"MHS Provides Key to WAN Communication", *PC Week*, Jan. 8, 1990, pp. 66, 70-71.
Novell, Inc., "NetWare MHS", 1989, 2 pages.
Oaz Communications, Inc., Fax Manager User's Guide, Feb. 1989, 48 pages.
Communication to Larry West re preliminary specification of Xenix System V device, Apr. 21, 1989, 7 pages.
Communication from Larry West re maximum number of bytes of DTMF codes, Apr. 21, 1989, 2 pages.
Oaz Communications, Inc., "NetFax Manager", 1990, 4 pages.
Paradox Development Corp., "Para-Mail", Nov. 1989, 1 page.
Dun & Bradstreet, Inc., Payment Profile, Jun. 17, 1991, 6 pages.
Steve, "Oaz Source Code Sale", Contracts between Oaz and Paradox, Nov. 11, 1991, 1 page.
United States Bankruptcy Court, Northern District of California, In Re Oaz Communications, Inc., Case No. 91-40335T, Hearing Notices, May 14-15, 1991, 2 pages.
Paradox Development Corp., "Para-Mail Communications Software for Novell Netware Users", Nov. 1990, 2 pages.
Oaz Communications, Inc., NetFax Manager Administrators Users Guide, Jun. 1990, 148 pages.
Fiore, Dave, Facsimile from Oaz Communications, Jun. 3, 1991, 2 pages.
Burkitt, Nick and Paradox Development Corp., Proprietary Information and Inventions Agreement, Sep. 6, 1989, 6 pages.
Paradox Development Corp., Work to Be Done, Jun. 5, 1991, 2 pages.
Novelo, Tonatiuh, Memo re NFUser, Mar. 27, 1991, 2 pages.
Fiore, Dave, Work to be done on NfUser Facsimile, May 28, 1991, 3 pages.
ParaEDitor function Paraedit(), 1989, 2 pages.
The Complete E-mail Program for Novell Networks with MHS. 1985.
McKenna & Fitting, Claims of Paradox Development Corporation letter, Feb. 7, 1992, 3 pages.
Paradox Development Corporation, Letter with Licensing and Professional Services Agreement of May 29, 1991, Jun. 7, 1991, 12 pages.
United States Bankruptcy Court, Northern District of California, In Re Oaz Communications, Inc., Case No. 91-40335T, Notice of Dec. 18, 1991 Hearing, Nov. 26, 1991, 1 p.

United States Bankruptcy Court, Northern District of California, In Re Oaz Communications, Inc., Case No. 91-40335T, Notice of Jan. 22, 1992 Hearing, Dec. 31, 1991, 1 page.
Land, Kris, Interoffice Memo re Oaz Communications, Summary of signed agreements, verbal discussions and verbal commitments, Dec. 31, 1991, pp. 1-13.
Notes on Oaz, Jun. 17-18, 1991, 2 pages.
Land, Kris, Federal Express Tracking Label, May 21, 1991, 1 page.
Paradox Development Corp., PM-Remote—Standalone Version of Para-Mail, Oct. 1990, pp. 1-4.
United States Bankruptcy Court, Northern District of California, In Re Oaz Communications, Inc., Case No. 91-40335T, Notice of Rejection of Contract, Nov. 5, 1991, 2 pages.
Giordano-Krausz, Eva, Letter re Oaz Communications Chapter 11, Nov. 6, 1991, 1 page.
United States Bankruptcy Court, Northern District of California, In Re Oaz Communications, Inc., Case No. 91-40335T, Appointment and Notice of Appointment of Committee of Creditors Holding Unsecured Claims, Jun. 25, 1991, 2 pages.
Land, Kris, Letter to Bankruptcy Court with attached Account Statement, May 10, 1991, 2 pages.
Land, Kris, Federal Express Tracking Label, May 10, 1991, 1 page.
Duncan, Thom, "Paramail Creates an E-mail Paradise", *LAN Times*, Feb. 4, 1991, vol. 8, Issue 3, 2 pages.
United States Bankruptcy Court, Northern District of California, In Re Oaz Communications, Inc., Case No. 91-40335T, Debtor's Proposed Disclosure Statement, Oct. 8, 1991, 31 pages.
Paradox Development Corp., brief description of the program "imp.sub.--cont.exe", Mar. 21, 1990, pp. 1-4.
Oaz Communications, Inc., NetFax User Quick Reference Guide, Jun. 1990, 29 pages.
United States Bankruptcy Court, Northern District of California, In Re Oaz Communications, Inc., Case No. 91-40335T, Proof of Claim, May 21, 1991, 1 page.
PMenu system, 1989, pp. 1-2.
United States Bankruptcy Court, Northern District of California, In Re Oaz Communications, Inc., Case No. 91-40335T, Notice of Status Conference, Jun. 6, 1991, 1 page.
Paradox Development Corp., Para-Mail User's Manual, Version 2.10, Jun. 30, 1989, 180 pages.
United States Bankruptcy Court, Northern District of California, In Re Oaz Communications, Inc., Case No. 91-40335T, Notice of Telephonic Hearing, Aug. 26, 1991, 1 page.
Paradox Development Corp., Statement Invoice of Aug. 27, 1991, 1 page.
United States Bankruptcy Court, Northern District of California, In Re Oaz Communications, Inc., Case No. 91-40335T, Notice of Continued Hearing on Disclosure Statement, Oct. 4, 1991, 1 page.
United States Bankruptcy Court, Northern District of California, In Re Oaz Communications, Inc., Case No. 91-40335T, Notice of Hearing on Disclosure Statement on Oct. 9, 1991, 1 page.
Binter, Joe, NotePad: Oaz Communications, Confidential Information, Jun. 1990-Feb. 1991, 1 page.
Stein, Donald, Letter re Hearing and request by Paradox for Oaz Disclousre Statement, Oct. 22, 1991, 2 pages.
Oaz Communications, Statement Invoice of Oct. 31, 1991, 1 page.
McKenna & Fitting, Letter to Don Stein re Oaz Communications Bankruptcy, Nov. 1, 1991, 1 page.
McKenna & Fitting, Letter to Don Stein re Oaz Communications Bankruptcy, Nov. 4, 1991, 2 pages.
West, Larry, Price for libraries for Oaz, Jun. 13, 1991, 2 pages.
United States Bankruptcy Court, Northern District of California, In Re Oaz Communications, Inc., Case No. 91-40335T Plan of Reorganization, Oct. 8, 1991, 13 pages.
Kramer, Matt, et al., "Facsimile\Routing through Gateway Servers", *PC Week*, Oct. 16, 1989, pp. 22, 28.
Fiore, Dave, NotePad: Oaz Communications, Confidential Information, Jun. 1991-Jul. 1991, 1 page.
oaz.114, Jul. 10, 1991, Letter to Dave Fiore at Oaz re NFUser License Agreement, 2 pages.
oaz.113, Jul. 3, 1991, Letter to Dave Fiore at Oaz re NFUser License Agreement, 1 page.

(56) References Cited

OTHER PUBLICATIONS oaz-exh.a, Jun. 7, 1991, Exhibit A, Description of Program, 1 page.

oaz.l12, Jun. 7, 1991, Letter re Licensing and Professional Service Agreement dated May 29, 1991, 1 page.

oaz.l11, Jun. 3, 1991, Letter re nonpayment, 1 page.

Phone Call Notes—Dave B. and Kris, Jul. 9, 1991, 6 pages.

Handbook for the Palm V Organizer-3Com Corporation, Copyright 1998-1999, pp. 1-244.

United States Patent and Trademark Office, Non-Final Office Action for U.S. Appl. No. 12/207,921, mailed Nov. 17, 2010, 50 pages.

United States Patent and Trademark Office, Non-Final Office Action for U.S. Appl. No. 12/207,921, mailed Apr. 27, 2011, 11 pages.

United States Patent and Trademark Office, Non-Final Office Action for U.S. Appl. No. 12/207,921, mailed Sep. 23, 2011, 10 pages.

United States Patent and Trademark Office, Final Office Action, U.S. Appl. No. 12/207,921, mailed Jan. 30, 2012, 12 pages.

United States Patent and Trademark Office, Non-Final Office Action for U.S. Appl. No. 10/795,655, mailed Apr. 20, 2007, 5 pages.

United States Patent and Trademark Office, Non-Final Office Action for U.S. Appl. No. 10/795,655, mailed Aug. 23, 2007, 7 pages.

United States Patent and Trademark Office, Non-Final Office Action for U.S. Appl. No. 10/795,655, mailed Feb. 6, 2008, 6 pages.

United States Patent and Trademark Office, Notice of Allowance for U.S. Appl. No. 10/795,655, mailed Jun. 12, 2008, 8 pages.

United States Patent and Trademark Office, Non-Final Office Action for U.S. Appl. No. 09/717,195, mailed Feb. 27, 2002, 31 pages.

United States Patent and Trademark Office, Non-Final Office Action for U.S. Appl. No. 09/235,566, mailed Feb. 27, 2002, 21 pages.

United States Patent and Trademark Office, Final Office Action for U.S. Appl. No. 09/235,566, mailed Sep. 24, 2002, 14 pages.

United States Patent and Trademark Office, Non-Final Office Action for U.S. Appl. No. 09/235,566, mailed Nov. 14, 2002, 12 pages.

United States Patent and Trademark Office, Notice of Allowance for U.S. Appl. No. 09/235,566, mailed Jul. 29, 2003, 10 pages.

United States Patent and Trademark Office, Notice of Allowance for U.S. Appl. No. 09/235,566, mailed Oct. 28, 2003, 7 pages.

United States Patent and Trademark Office, Non-Final Office Action for U.S. Appl. No. 09/717,193, mailed Feb. 27, 2002, 45 pages.

United States Patent and Trademark Office, Final Office Action for U.S. Appl. No. 09/717,193, mailed Aug. 28, 2002, 44 pages.

United States Patent and Trademark Office, Advisory Action for U.S. Appl. No. 09/717,193, mailed Dec. 30, 2002, 5 pages.

United States Patent and Trademark Office, Non-Final Office Action for U.S. Appl. No. 09/717,193, mailed Apr. 8, 2003, 13 pages.

United States Patent and Trademark Office, Notice of Allowance for U.S. Appl. No. 09/717,193, mailed Oct. 7, 2003, 11 pages.

United States Patent and Trademark Office, Non-Final Office Action, U.S. Appl. No. 13/457,408, mailed Sep. 17, 2012, 28 pages.

United States Patent and Trademark Office, Final Office Action, U.S. Appl. No. 13/457,408, mailed Feb. 1, 2013, 12 pages.

United States Patent and Trademark Office, Notice of Allowance, U.S. Appl. No. 13/457,408, mailed Mar. 13, 2013, 11 pages.

United States Patent and Trademark Office, Non-Final Office Action, U.S. Appl. No. 13/161,453, mailed Sep. 6, 2011, 6 pages.

United States Patent and Trademark Office, Non-Final Office Action, U.S. Appl. No. 13/161,453, mailed Nov. 28, 2011, 9 pages.

United States Patent and Trademark Office, Final Office Action for U.S. Appl. No. 13/161,453, mailed Apr. 9, 2012, 11 pages.

United States Patent and Trademark Office, Non-Final Office Action for U.S. Appl. No. 13/161,453, mailed Aug. 1, 2012, 12 pages.

United States Patent and Trademark Office, Notice of Allowance, U.S. Appl. No. 13/161,453, mailed Feb. 15, 2013, 14 pages.

International Searching Authority, International Search Report, PCT Application PCT/IB97/001455, mailed Apr. 1, 1998, 4 pages.

European Patent Office, Supplementary European Search Report, EP Application 97910596, mailed Nov. 7, 2000, 3 pages.

United States Patent and Trademark Office, Non-Final Office Action, U.S. Appl. No. 08/839,655, mailed Aug. 20, 1998, 8 pages.

United States Patent and Trademark Office, Non-Final Office Action, U.S. Appl. No. 08/839,655, mailed Dec. 10, 1998, 6 pages.

United States Patent and Trademark Office, Notice of Allowance, U.S. Appl. No. 08/839,655, mailed Jun. 4, 1999, 5 pages.

United States Patent and Trademark Office, Non-Final Office Action, U.S. Appl. No. 08/915,196, mailed Feb. 3, 1999, 9 pages.

United States Patent and Trademark Office, Final Office Action, U.S. Appl. No. 08/915,196, mailed Jun. 22, 1999, 10 pages.

United States Patent and Trademark Office, Notice of Allowance, U.S. Appl. No. 08/915,196, mailed Sep. 7, 1999, 6 pages.

United States Patent and Trademark Office, Non-Final Office Action, U.S. Appl. No. 08/933,460, mailed Dec. 11, 1998, 7 pages.

United States Patent and Trademark Office, Non-Final Office Action, U.S. Appl. No. 08/937,124, mailed Jan. 22, 1999, 9 pages.

United States Patent and Trademark Office, Final Office Action, U.S. Appl. No. 08/937,124, mailed Jun. 22, 1999, 12 pages.

United States Patent and Trademark Office, Notice of Allowance, U.S. Appl. No. 08/937,124, mailed Sep. 7, 1999, 6 pages.

United States Patent and Trademark Office, Non-Final Office Action, U.S. Appl. No. 09/364,342, mailed May 19, 2000, 18 pages.

United States Patent and Trademark Office, Final Office Action, U.S. Appl. No. 09/364,342, mailed Jan. 17, 2001, 13 pages.

United States Patent and Trademark Office, Non-Final Office Action, U.S. Appl. No. 09/364,342, mailed Apr. 27, 2001, 8 pages.

United States Patent and Trademark Office, Final Office Action, U.S. Appl. No. 09/364,342, mailed Sep. 25, 2001, 9 pages.

\* cited by examiner

| Col. 1 | Col. 2 | Col. 3 |
|---|---|---|
| Char | Key | Presses |
| 1 | ABC1 | 1111 |
| 2 | DEF2 | 1111 |
| 3 | GHI3 | 1111 |
| 4 | JKL4 | 1111 |
| 5 | MNO5 | 1111 |
| 6 | PQR6 | 1111 |
| 7 | STU7 | 1111 |
| 8 | VWX8 | 1111 |
| 9 | YZ9 | 111 |
| 0 | SPC | 1 |
| A | ABC1 | 1 |
| B | ABC1 | 11 |
| C | ABC1 | 111 |
| D | DEF2 | 1 |
| E | DEF2 | 11 |
| F | DEF2 | 111 |
| G | GHI3 | 1 |
| H | GHI3 | 11 |
| I | GHI3 | 111 |
| J | JKL4 | 1 |
| K | JKL4 | 11 |
| L | JKL4 | 111 |
| M | MNO5 | 1 |
| N | MNO5 | 11 |
| O | MNO5 | 111 |
| P | PQR6 | 1 |
| Q | PQR6 | 11 |
| R | PQR6 | 111 |
| S | STU7 | 1 |
| T | STU7 | 11 |
| U | STU7 | 111 |
| V | VWX8 | 1 |
| W | VWX8 | 11 |
| X | VWX8 | 111 |
| Y | YZ9 | 1 |
| Z | YZ9 | 2 |
| .COM | .EXT | 1 |
| .NET | .EXT | 11 |
| .GOV | .EXT | 111 |
| .EDU | .EXT | 1111 |
| .ORG | .EXT | 11111 |
| @ | SPC | 11 |
| # | SPC | 111 |
| * | SPC | 1111 |
| $ | SPC | 11111 |
| ~ | SPC | 111111 |
| ! | SPC | 1111111 |
| & | SPC | 11111111 |
| + | SPC | 111111111 |
| = | SPC | 1111111111 |
| \\ | SPC | 11111111111 |

FACSIMILE TO E-MAIL COMMUNICATION SYSTEM WITH LOCAL INTERFACE

CROSS-REFERENCE TO RELATED APPLICATIONS

This application is a continuation of U.S. patent application Ser. No. 13/457,408, filed on Apr. 26, 2012, now U.S Pat. No. 8,488,207; which is a continuation of U.S. patent application Ser. No. 12/207,921, filed on Sep. 10, 2008; which is a continuation of U.S. patent application Ser. No. 10/795,655, filed on Mar. 8, 2004, now U.S. Pat. No. 7,446,906; which is a continuation of U.S. patent application Ser. No. 09/717,193, filed on Nov. 21, 2000, now U.S. Pat. No. 6,707,580; which is a continuation of U.S. patent application Ser. No. 09/235,566 filed on Jan. 22, 1999, now U.S. Pat. No. 6,693,729; which is a continuation of International Patent Application PCT/IB1997/001455, filed on Oct. 7, 1997; which claims the benefit of L.J.S. Provisional Patent Applications 60/048,064, filed on May 30, 1997; and 60/028,405, filed on Oct. 15, 1996; all of which are hereby incorporated herein in their entireties by reference.

U.S. patent application Ser. No. 09/235,566 is also a continuation-in-part of U.S. patent application Ser. No. 08/839,655, filed on Apr. 15, 1997; which claims the benefit of U.S. Provisional Patent Application 60/028,405, filed Oct. 15, 1996; U.S patent application Ser. No. 09/235,566 is also a continuation-in-part of U.S. patent application Ser. No. 08/915,196, filed on Aug. 20, 1997, now U.S. Pat. No. 6,025,931; which claims the benefit of U.S. Provisional Patent Application Nos. 60/048,064, filed on May 30, 1997; and 60/028,405, filed on Oct. 15, 1996; all of which are hereby incorporated herein in their entireties by reference.

BACKGROUND OF THE INVENTION

The present invention relates generally to the field of communications associated with the communication of facsimile messages and associated with the uniting of traditionally distinct message delivery systems such as facsimile delivery and electronic mail delivery.

The popularity of the quick and easy facsimile delivery of messages and the popularity of low cost delivery of messages via electronic mail (also referred to as "E-mail") messaging systems have for quite some time enticed attempts to mingle the two technologies, and efforts have become even more fervent in the wake of the recent explosive increase in use of the global computer data network known as the "Internet". An early attempt to mingle facsimile and Email message delivery technologies is represented by the Facsimile Transmission System of U.S. Pat. No. 4,941,170 (Herbst). Herbst appears to show a system which uses an E-mail system to route a facsimile file between controllers associated with the E-mail network in order to accomplish, in the end result, a facsimile input and a facsimile output. U.S. Pat. No. 4,837,798 (Cohen, et al.) discloses a system whose stated goal is to provide a single, "unified" electronic mailbox for storing either messages or notification of the existence of messages of different types. Cohen, et al. does mention the integration of facsimile mail messages, but does not appear to clearly discuss how the system would handle such fax messages. U.S. Pat. No. 5,339,156 (Ishii) discloses a system where a data communication center and a facsimile mail center are linked in a manner to accomplish the delivery of E-mail messages by way of facsimile, but not visa versa. At the same time, the facsimile industry has seen a growth in the use of interactive communication with remote store and forward facilities ("SAFF") for storage in a "fax mailbox" in digital image form and managed delivery of facsimile messages, as exemplified by U.S. Pat. No. 5,291,203 (Gordon, et al.); and further, the art includes the use of locally appended devices to the sending fax device to intercept commands and route facsimile messages, in facsimile form, to a remote SAFF for subsequent delivery to a destination facsimile device, as exemplified by U.S. Pat. No. 5,555,100 Bloomfield, et al. Each of the above-mentioned references appears dedicated to the ultimate delivery of the message to a destination fax machine or fax capable device such as an equipped personal computer ("PC").

SUMMARY OF THE INVENTION

Briefly described, the present invention comprises a fax to E-mail system and related method whereby a facsimile transmission is sent to its recipient via electronic mail (such as through the "Internet") rather than via another facsimile machine, and is delivered in such a manner that it can be retrieved by the recipient at his/her E-mail device, in the ordinary course of retrieving the E-mail, and viewed on the screen of the E-mail device. The invention provides for and accomplishes the delivery of a document, which begins as a hardcopy, as an electronic file retrieved through an E-mail recipient's terminal and read at the computer screen of the E-mail recipient's terminal.

The system of the present invention includes, in its most preferred apparatus and method embodiments, among other elements, a "local interface" and a remotely located Facsimile/E-mail server system (FEM-GATEWAY) which cooperate to provide a Facsimile/E-mail service whereby hardcopy information, including textual and/or graphical portions, is communicated between a facsimile device and an E-mail device, while still allowing conventional operation of the facsimile device. More specifically, the present invention comprises apparatus and methods for the input of an E-mail address locally to a facsimile machine, for directing the transmission of the image to a remotely located FEM-GATEWAY, for receiving and converting data representative of an image scanned by the facsimile device (referred to herein as facsimile information) into a computer-readable data file formatted in an image data file format, for creating an addressed E-mail message to which the computer-readable data file is attached, and for delivering the E-mail and attachment to a desired recipient over a data network such as a global computer network, such as the "Internet".

In its preferred embodiments, the interface device of the present invention uniquely receives an alphanumeric E-mail address, displaying the address for verification by the user, is specially configured to command the FEM-GATEWAY to transmit a fax document via E-mail, and conveys an E-mail address and fax message (through the attached fax device) to the FEM-GATEWAY. The interface device allows any pre-existing fax machine to function as the sending machine of the invented system, with no modification to the fax machine itself. The present invention's handling of the fax message by converting the message to a computer-readable image file and attaching it to a system generated E-mail message, and the system's cooperative interaction between the interface device and the FEM-GATEWAY uniquely allow the present invention to accomplish its intended goal of delivering fax messages via the E-mail system. In at least one alternate embodiment, the functions of the interface device are embedded into a conventional fax device.

The present invention bridges two networks, interacting first in the telephone network (PTN) to transmit as telephony signals a facsimile message to the FEM-GATEWAY and then interacting in the E-mail network (through the "Internet" or other data networks) to deliver an E-mail message to its intended E-mail address. A sender wishing to send a facsimile message selectively activates the interface device locally associated with the sending fax machine which results in the fax being sent differently than a normal fax transmission. In accordance with the preferred embodiments, the interface device initiates a connection through the PTN to a server at a remote FEM-GATEWAY, and the interface device interacts with that server to generate and deliver to the intended recipient's E-mail address an E-mail message to which is attached the facsimile document formatted as a computer-readable image file compatible with the recipient's E-mail terminal.

Numerous features, objects and advantages of the present invention in addition to those mentioned or implied above, will become apparent upon reading and understanding this specification, read in conjunction with the appended drawings.

DETAILED DESCRIPTION OF THE PREFERRED EMBODIMENTS

Figure 1:
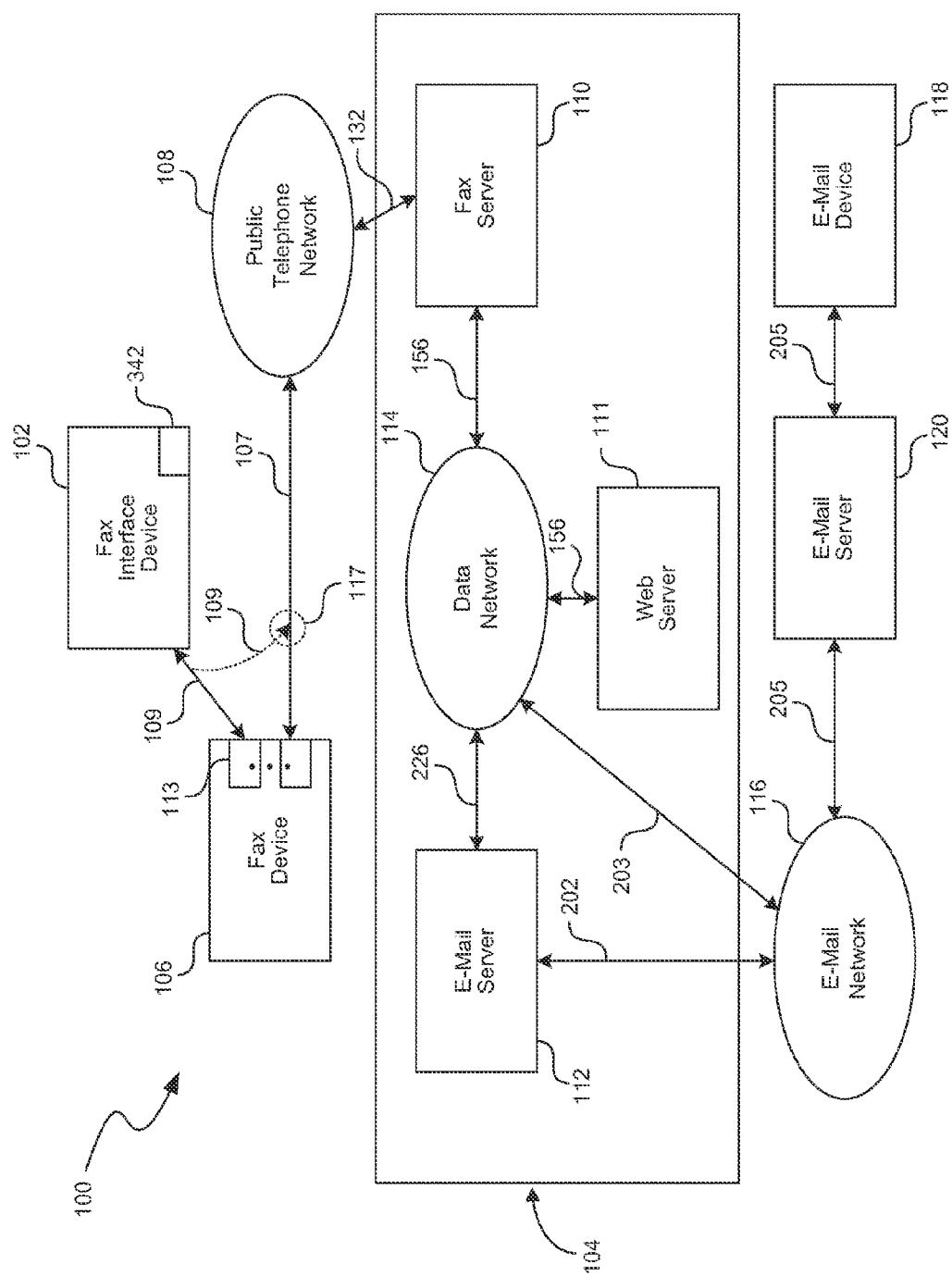
FIG. 1 is a block diagram of a facsimile-to-electronic mail communication system according to a preferred embodiment of the present invention.

Refer now in greater detail to the drawings in which like numerals represent like components throughout the several views and in which lower letter reference numeral suffixes differentiate similar components referred to collectively without such suffixes. FIG. 1 displays a Facsimile-to-Electronic mail communication system 100 (also referred to herein as a "Fax/E-mail communication system 100") comprising a facsimile interface device 102 (also referred to herein as "fax interface device 102"), having a keypad 342, and a Facsimile-to-E-mail server 104 (also referred to herein as a "FEM-GATEWAY 104"). The fax interface device 102 is associated with a fax device 106, and both devices 102, 106 connect to the FEM-GATEWAY 104 through a common communication line 107 (also sometimes referred to herein as "fax phone line 107" or as "fax line 107") and the telephone network (PTN) 108. In accordance with the preferred embodiment of the present invention, the common communication line 107 is a central office ("CO") telephone line having dial tone generated thereon and having tip and ring capabilities all generated and managed by a local exchange carrier central office of the telephone network 108. Note that "PTN" is a common designation considered to be generally understood by those skilled in the telecommunications industry as including any number of local exchange carrier central offices, access tandems, long distance toll offices, and other telecommunication switching systems.

In a first preferred embodiment of the present invention, the fax interface device 102 is connected by an accessory line 109 (which, in the preferred embodiment is a standard telephone cable) to the standard "telephone out" RJ-11 jack 113 (also, sometimes referred to as the "accessory jack" 113) of a standard fax device 106 (for example, conventional stand alone fax machine or multifunction machine with fax capabilities). Alternatively, the accessory line 109' by-passes the accessory jack 113 and connects at, for example, a line splitter 117, directly to the common communication line 107. As would be understood by one skilled in the art, this places the fax interface device 102 "on line" with the fax device 106 such that both the fax interface device 102 and fax device 106 are serviced in what might be termed a "parallel relationship" by the same communication line 107 to the public network 108.

The FEM-GATEWAY 104 comprises a Fax-Server 110, a Web Server 111, an E-mail-server 112, and a data network 114. The Fax-Server 110 connects to the E-mail-server 112, and a data network 114. The Fax-Server 110 connects to the data network 114 which includes, in accordance with the preferred embodiment of the present invention, use of a TCP/IP protocol running on Ethernet hardware and includes, but is not limited to routers, hubs, cabling, and other hardware and software necessary for proper connection to the E-mail network and to the E-mail server). It should be understood that the scope of the present invention includes other data networks 114, including local and wide area data networks which utilize other network protocols and network hardware. The E-mail-server 112 connects to an E-mail network 116 (i.e., a network such as the Internet, a satellite network, a cable network, a telephony network, a wireless network, or other data network) which enables the communication of electronic mail (referred to herein as "E-mail") to an E-mail device 118. An E-mail interface device 120 (including, for example and not limitation, hardware and software systems known as E-mail servers) (hereinafter also referred to as E-mail server 120) connects the E-mail device 118 to the E-mail network 116 and, hence, to the gateway E-mail-server 112 through the E-mail network 116. The Web Server 111 connects to Fax-Server 110, gateway E-Mail-server 112, and data network 114, and hence to the E-mail network 116. It should be understood that the connecting lines shown in FIG. 1 represent many types of communication links, including standard telephone lines, data communication networks, wireless communication networks, cable communication networks, or other networks. As will be understood by those skilled in the art, a user of the E-mail network 116 is provided with an "e-mail address" which corresponds to an electronic "mailbox" "associated with" the user and residing on the E-mail server 120 or elsewhere along the E-mail network.

While only one fax device 106 and only one fax interface device 102 are shown in FIG. 1, the fax device 106 and the fax interface device 102 are, respectively, representative of a plurality of fax devices 106 and a plurality of fax interface devices 102 wherein each fax device 106 of the plurality of fax devices 106 is associated with a single fax interface device 102 of the plurality of fax interface devices 102. It should be understood that the plurality of fax devices 106 includes any fax-capable device, including for example and not limitation, conventional facsimile machines, multi-function machines which can operate as fax machines, or image scanners which can operate as fax sending devices.

It should be noted that while only one E-mail device 118 and only one E-mail server 120 are shown in FIG. 1, the E-mail device 118 and E-mail server 120 are, respectively, representative of a plurality of E-mail devices 118 and a plurality of E-mail servers 120 wherein each E-mail device 118 of the plurality of E-mail devices 118 is associated with a single E-mail server 120 of the plurality of E-mail servers 120. In accordance with the preferred embodiment of the present invention, the E-mail devices 118 comprise personal computers which execute software programs (including, for example and not limitation, software programs known in the industry as "browsers" and "E-mail readers"—sometimes collectively referred to herein as "E-mail browsers") that enable an E-mail recipient to receive E-mail delivered to the recipient via the E-mail network 116, to display E-mail messages and image data files, and optionally, to print E-mail messages and image data files on a connected printer. It should be understood that E-mail devices 118 include all sorts of stationary and portable, local and network, computer-related devices executing software programs that provide E-mail communication and display capabilities. It should also be understood that E-mail servers 120 include, for example and not limitation, hardware, software, communication programs, analog communication interfaces, digital communication interfaces, optical communication interfaces, wired and wireless communication interfaces, cable communication interfaces, various modems, and other E-mail communication enabling hardware adapters and software programs located either on the user's premises or located in the network or both. Furthermore, it should be understood that the scope of the present invention includes E-mail servers 120 which consist of units separate from their associated E-mail devices 118 and E-mail servers 120 which are incorporated into their associated E-mail devices 118.

Figure 2:
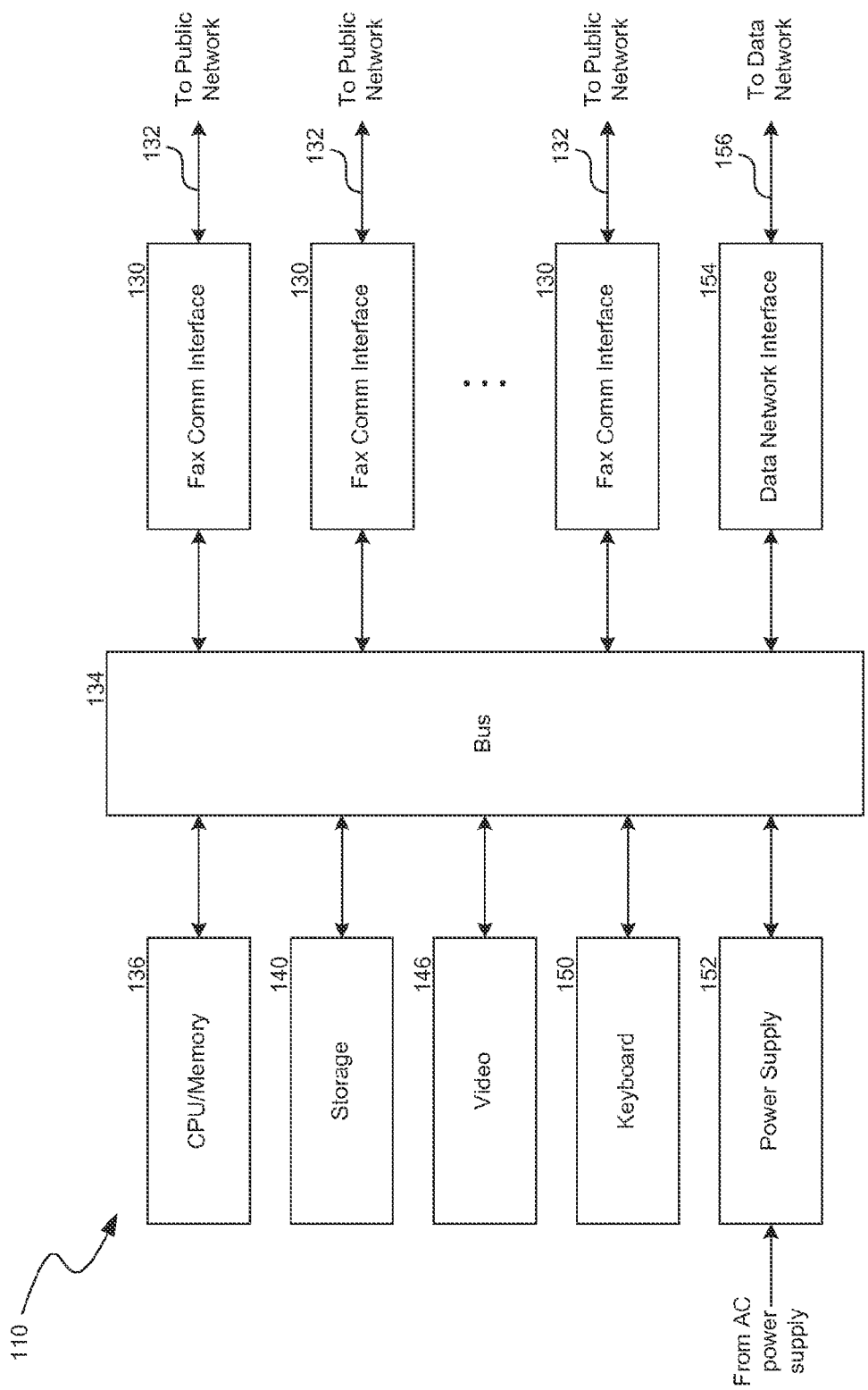
FIG. 2 is a block diagram of a Fax-Server of the system depicted in FIG. 1.

FIG. 2 displays, in a block diagram representation, the Fax-Server 110 according to the preferred embodiment of the present invention. The Fax-Server 110 comprises a plurality of fax/data communication interfaces 130 which connect to the PN 108 through a PN communication link and to a bus 134 for interchange of signals with other components of the Fax-Server 110. Preferably, the PN communication link 132 is a standard T-1 digital communication link providing multiplexed, encoded carrier service. Alternately, the PN communication link 132 includes a linking or network system (see, for example, that communication link 132" depicted in and discussed in connection with FIG. 16, below). The fax/data communication interfaces 130 provide a plurality of fax and data communication channels for communication of data between the Fax-Server 110 and fax interface devices 102. Each fax/data communication interface 130 is capable of performing a variety of functions on each fax communication channel including, for example: answering a phone line; hanging-up a phone line; dialing a phone number; sending fax data; receiving fax data; sending data signals; receiving data signals; generating DTMF (dual tone multi-frequency) tones; detecting DTMF tones; receiving ANI (automatic number identification—the number from which a caller initiates a call) and DNIS (dialed number identification service—the number dialed by the caller) information via, preferably, for example, Feature Group D; playing voice messages; and, converting voice signals between analog and digital formats. An example of a fax/data communication interface 130, acceptable in accordance with the preferred embodiment of the present invention, is a model VFX40ESC voice/fax/modem communication interface available from Dialogic of Parsippany, N.J. It should be understood that the connecting lines shown in FIG. 2 represent many types of communication links, including direct links defined by direct contact between components and indirect links defined by various cables, wires, etc.

Other components of the Fax-Server 110 shown in FIG. 2 include: a central processing unit (CPU) 136 with random access memory (RAM); a mass storage 140 which provides program and data storage (including storage of fax image data and information received from a fax device 106 connected to and communicating with the Fax-Server 110; a video display 146, keyboard 150, and power supply 152—all of the foregoing components configured and inter-operating in a manner that will be clearly understood by one skilled in the art.

The Fax-Server 110, as seen in FIG. 2, also includes a data network interface 154 by which the Fax-Server 110 exchanges data with the data network 114, via cable 156, to enable communication of data between the Fax-Server 110 and the E-mail-Server 112. The data network interface 154 performs the signal conditioning and format conversions which are necessary to communicate data through the data network 114. A data network interface 154, acceptable in accordance with the preferred embodiment of the present invention, is a model SMC9332DST available from Standard Microsystems Corporation of Hauppauge, N.Y., which is compatible with the 100Base T Ethernet standard and the TCP/IP protocol. It should be understood that the scope of the present invention includes other data network interfaces 154 including, for example and without limitation, wired and wireless data network interfaces, analog data network interfaces, digital data network interfaces, optical data network interfaces, and data network interfaces compatible with other hardware and software standards and protocols.

The Fax-Server 110 monitors its fax/data communication channels for a call from a fax interface device 102. Upon receiving such a call on its fax/data communication channel, the Fax-Server 110 services the call by, among other tasks: verifying (against a stored list of valid identification codes of fax interface devices 102) that the call is to be processed; receiving from the fax interface device 102, an E-mail address associated with a desired recipient of a document; optionally receiving information identifying the sender; receiving fax image data representative of the document to be communicated to the desired recipient; optionally preparing and forwarding a confirmation (i.e., a fax document comprising a single page having text which indicates that the recipient's E-mail address and the fax image data representing the document were received by the Fax-Server 110) to the fax device 106; and, preparing and forwarding an E-mail message 270 (see FIG. 4), having an E-mail message portion 272 and an attached image data file 274 including data representative of the document, to the E-mail-Server 112. The Fax-Server 110 processes the fax image data received from a fax device 106, along with information received from the fax interface device 102, and converts the fax image data to image data (hereinafter sometimes referred to as the "formatted image data") formatted in any one of several industry-standard formats for images or bit-mapped graphic images, including, for example and not limitation, formats such as "GIF" "PCX", "DCX" "TIFF", and "BMP", "JPEG", "PNG", "AWD".

In accordance with the preferred embodiment of the present invention, the Fax-Server 110 is programmed to convert fax image data received from all of the plurality of fax devices 106 which deliver to the Fax-Server into the same, pre-selected industry-standard format, as selected by the administrator of the FEM-GATEWAY 104. It is intended, as part of the preferred embodiment of the present invention, that the selected format into which the Fax-Server 110 is preferably programmed to convert fax image data is a format which will be automatically compatible with major E-mail readers and browsers available on the market at a given period of time. Thus, at the time of the writing of this disclosure, the preferred format is the "TIFF format". In accordance with the preferred embodiments of the present invention, the selected format into which the fax image data is to be converted is periodically changed (and the Fax-Server 110 processes appropriately modified) by the administrator to be compatible with the automatic de-coding and re-assembling software utilized by, for example, a majority (or selected plurality) of browsers and E-mail readers on the "then current" market for E-mail devices 118.

Thus, in accordance with the preferred methods of the present invention, the Fax-Server 104, upon receiving a fax message delivered from a fax device 106, automatically converts the received fax image data to a TIFF formatted file, naming the TIFF file with the appropriate ".TIF" file extension.

Figure 3:
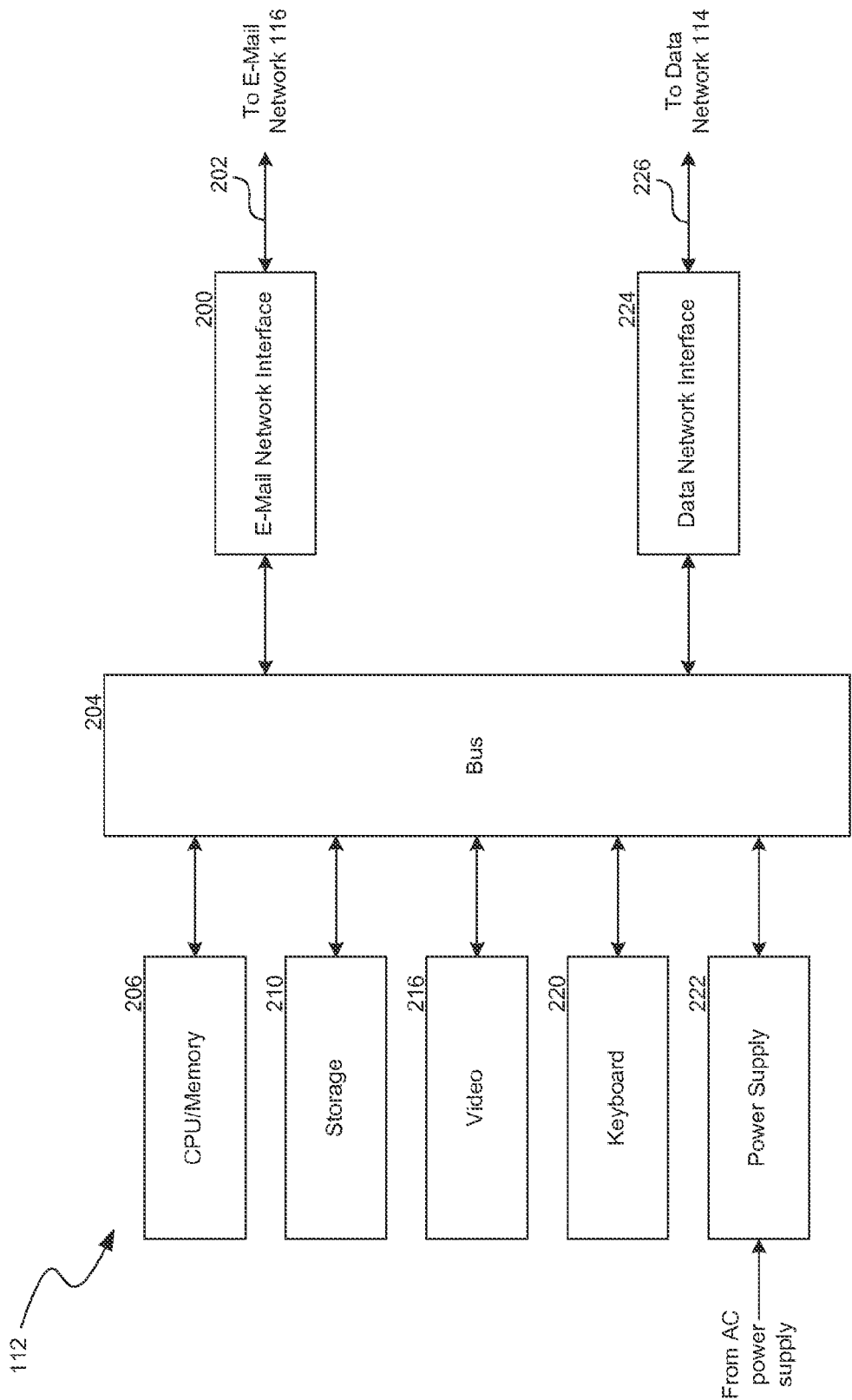
FIG. 3 is a block diagram of the process and data architecture of E-mail server depicted in FIG. 1.

FIG. 3. displays, in a block diagram representation, the E-mail Server 112 according to the preferred embodiment of the present invention. The E-mail Server comprises an E-mail network interface 200 which connects to the E-mail network 116 through a communication link 202 and to a bus 204 for interexchange of signals with other components of the E-mail Server 112. Preferably, the communication link 202 is a standard Ethernet communication link providing high-speed TCP/IP communication carrier services. The E-mail network interface 200 is capable of multiplexed, encoded communication exchanges to the E-mail network. The E-mail Server 112 is considered readily understood by those skilled in the art and performs, as is critical to the present invention, functions of receiving the addressed E-mail with attachment (the E-mail message 270) and routing the E-mail message to the appropriate network address along the E-mail network 116, using, for example, TCP/IP and appropriate domain addressing and domain name services. FIG. 3 further schematically depicts other basic components of a standard E-mail Server including a data network interface 224 through which the E-mail Server interacts with the data network 114, a central bus 204, CPU with RAM memory 206, mass storage 210, a video display 216, keyboard 220, and power supply 222—all of the foregoing components being configured and inter-operating in a manner that will be clearly understood by one skilled in the art. Though deemed unnecessary in light of the relevant skill in the art, the following are given by way of example as acceptable components of the E-mail Server 112: E-mail network interface 200 as a model 1400FXSA modem available from Practical Peripherals, Inc. of Thousand Oaks, Calif.; data network interface 224 as a model SMC9332DST available from Standard Microsystems Corporation of Hauppauge, N.Y. which is compatible with the 100BaseT Ethernet Standard and the TCP/IP protocol; and "Microsoft Exchange Mail" or "UNIX SENDMAIL" operating on the CPU 206. In alternate embodiments of the present invention, all or some of the E-mail functions of the gateway E-mail Server 112 are incorporated as part of and performed by the Fax-Server 110. Furthermore, in alternate embodiments, the data network 114 is simply the bus of a single PC which hosts the appropriate hardware and software of both the Fax-Server 110 and the E-mail Server 112, and the CPU/RAM, storage, video, keyboard and power supply are common, all as would be understood to one skilled in the art. Further explanation of the E-mail Server 112 is deemed not necessary as the appropriate hardware, software and operation thereof is considered well known to those skilled in the art.

Figure 4:
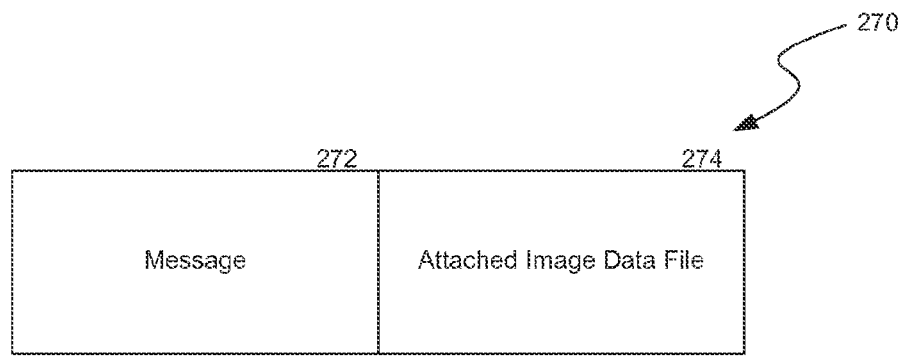
FIG. 4 is a schematic representation of an E-mail message in accordance with the preferred embodiment of the present invention.

FIG. 4 displays a schematic representation of an E-mail message 270 in accordance with the preferred embodiment of the present invention. The E-mail message 270 comprises a message portion 272, described below, and attached image data file 274. The attached image data file 274 includes image data representative of the document being communicated, via E-mail, from the sender's fax machine 106 to the recipient's E-mail device 118 by the FAX/Email communication system 100. The image data stored in the attached image data file 274 is, preferably, the previously mentioned formatted image data, and, as previously mentioned, preferably in a selected format of wide compatibility with then current browsers and E-mail readers.

Figure 5:
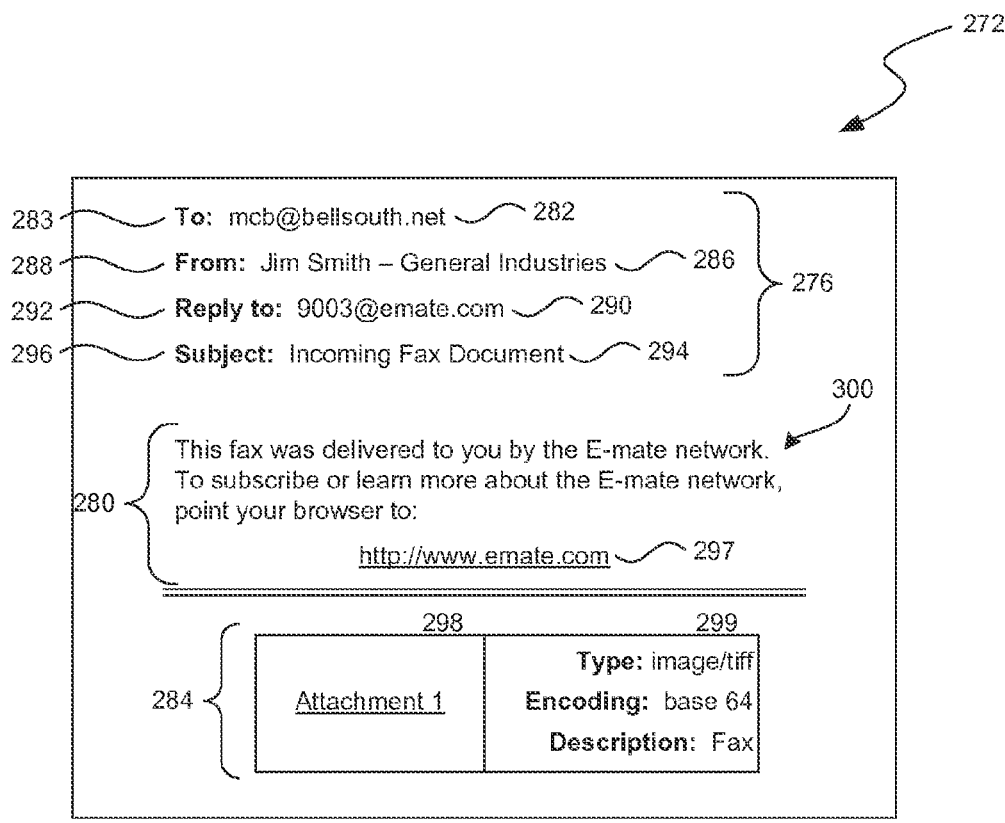
FIG. 5 is an example of a recipient viewed message portion of an E-mail message generated and forwarded in accordance with the preferred embodiment of the present invention.

The message portion 272, of the E-mail message 270 is generated by the Fax-Server 110 and forwarded to the gateway E-mail Server 112 for delivery to the E-mail network 116. The message portion 272 comprises a plurality of information which corresponds to that same information displayed in the message portion 272' depicted in FIG. 5. The message portion 272' is depicted in FIG. 5 in an exemplary manner as it would appear on the user's screen at the E-mail device 118, and shall be referred to sometimes herein as the recipient viewed message portion 272', as distinguished from the Fax-Server 110 generated message portion 272. The exemplary recipient viewed message portion 272', comprises a header portion 276, a body portion 280, and an attachment portion, 284. The header portion 276 of the recipient viewed message portion 272' includes a plurality of descriptive text labels and associated fields. A "TO" field 282, adjacent to a "To"

descriptive text label 283, indicates the E-mail address of the intended recipient of the E-mail message 270 as input by the sender using the keypad 342 of the fax interface device 102. The recipient viewed message portion 272' includes a "FROM" field 286, adjacent a "From:" descriptive text label 288, which indicates generically, the sender's identity as known to the Fax/E-mail communication system 100. (For example, the name of the entity where the sender's fax device 106 and fax interface device 102 are located). A preferred alternative embodiment which is optional to the sender as input by the sender using the keypad 342 of the fax interface device 102 is to include beside the sender's generic identity in text field 286, the name of the individual sender as known to the Fax/E-mail communication system 100. A "REPLY TO". field 290, adjacent a "Reply To:" descriptive text label 292 provides an E-mail address of the FEM-GATEWAY 104 and a transaction code associated with the sender's fax interface device 102 which code is generated by the FEM-GATEWAY system for job tracking and problem reporting. The recipient viewed message portion 272' also includes a "SUBJECT" field 294, adjacent a "Subject:" descriptive text label 296, which contains a notice to the recipient that the E-mail message 270 includes an incoming fax as an attached image file.

The body portion 280 of the exemplary recipient viewed message portion 272', as seen in FIG. 5, includes text 300 which provides advertising and instructs the recipient of the E-mail message 270 on how to view the attached image data file 274 (i.e. document). The text 300 also instructs the recipient on how to access additional information about the services provided through the communication system 100, including, if required, how to receive a compatible viewer software program capable of displaying the attached image data file 274. The body portion 280 includes, in this displayed embodiment, a link 297 to a location along the E-mail network 116, such as an HTML link 297 which references and enables access to an Internet web page where information and access to viewer software is available to the recipient. The use of an "HTLM link" as a reference to a protocol used to interface to Internet web pages is considered to be well-known to those skilled in the art. The use of a "web page" as a reference to a communications medium as associated with the Internet global computer network is considered to be well-known to those skilled in the art.

The attachment portion 284 of the exemplary recipient viewed message portion 272', as seen in FIG. 5, includes a "handle" 298 which references and enables access to the image data file 274 attached to the message portion 272. The handle 298 is that assigned by the browser of the E-mail device 118 at the time that the attachment is downloaded by and stored at the E-mail device. The use of a "handle" as a reference to a file is considered to be well-known to those skilled in the art. The image data file 274, as noted, includes a representation of the document sent by the sender for receipt by the recipient of the E-mail message 270. A descriptive textual portion 299, adjacent to the handle portion 298, provides informative data to the recipient regarding the type, encoding scheme, description, and other information relative to the attachment 274.

The information and data used to populate the "fields" 282, 286, 290, of the header portion 276, as well as the text 300 and link data 297 of the body portion 280, as well as the informative data found in the textual portion 299 is all information and data received by the Fax-Server 110 during steps 1034 and 1036 of the process described below (see FIG. 11A) and/or generated at step 1074 of the process (see FIG. 11C), and is that information and data which constitutes the message portion 272 of the E-mail message 270 depicted in FIG. 4.

Figure 6:
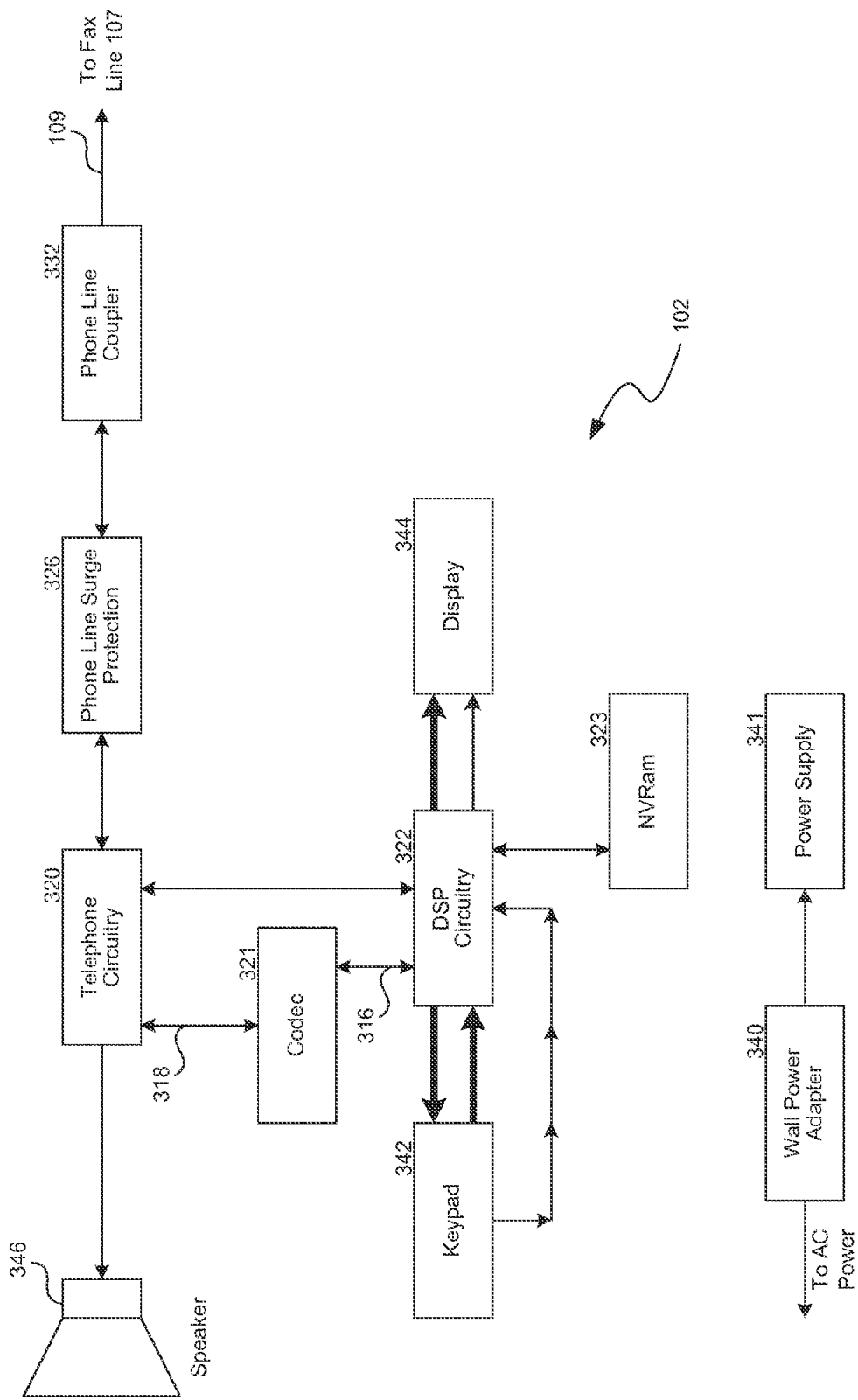
FIG. 6 is a block diagram of a fax interface device of the system depicted in FIG. 1.

FIG. 6. displays a block diagram representation of a fax interface device 102 in accordance with the apparatus of the preferred embodiment of the present invention. The device performs a variety of functions including accepting inputs at the keypad 342, displaying information at a Display 344, interfacing to the communication line 107, and engaging in interactive communications with the FEM-GATEWAY 104.

The fax interface device 102 comprises telephony circuitry 320 which connects to and interacts with DSP circuitry 322 and Codec circuitry 321 to provide telephony interface support. The Telephony Circuitry connects through a phone line surge protector 326, a phone line coupler 332 and the accessory telephone line 109 to the communication line 107, which also connects to a fax device 106. As mentioned earlier, the fax interface device 102 is preferably connected (in "parallel relationship" with the fax device 106) to the common communication line 107 through connection to the accessory RJ-11 jack 113 of a standard fax machine or fax modem, and, alternatively, through connection of accessory telephone line 109 via splitter 117 to communication line 107.

The Codec circuitry 321 connects to the telephony circuitry 320 and to the DSP circuitry 322, performing analog to digital conversions for tone generation and detection. An example of this Codec is a Texas Instruments TCM29C16 available from Texas Instruments, located in Houston Tex.

The DSP circuitry 322, according to the preferred embodiment of the present invention, comprises a Digital Signal Processor with integrated flash memory for program storage, RAM for temporary data storage, a Codec interface for audio input and output, and an expansion bus to connect other needed peripherals. An example of this DSP is a Texas Instruments TMS320F206 available from Texas Instruments in Houston, Tex.

The DSP circuitry 322 is connected to serial nonvolatile memory, NVRam 323, to the Display 344 comprised, for example, of a Liquid Crystal Display (LCD) with built-in controller, and to the keypad (FIG. 10a) 342 comprising a standard telephony-styled DTMF keypad and custom control buttons. The NVRam 323 performs memory functions such as storage of E-mail addresses and serial number information regarding the interface device 102. An example of this type of NVRAM is 24c65/sm-ND available from Microchip Technology located in Chandler Ariz. An example of the Display is the DMC-24227NYU available from Optrex, located in Torrence, Calif.

The telephony circuitry 320 is connected to Codec 321, speaker 346, and to surge protection circuitry 326. The telephony circuitry 320 performs a variety of functions including ring detection, loop current, and on and off hook control. An example of this circuitry is the TS117 available from CP Clare, located in Wakefield Mass. The Speaker 346 provides line monitoring and program control audio feedback. An example of Speaker 346 as an amplifier is the LM380 available from National Semiconductor located in Santa Clara, Calif. The phone line coupler 332 connects to the Surge protection 326 and provides a telephony jack for interfacing to accessory telephone line 109 which is connected to fax device 106. An example of such a suitable coupler is 555979-1 from AMP Incorporated, located in Harrisburg, Pa. A power supply 341 connects through power adapter 340 to a source of a AC power and supplies necessary power to the components of the interface device 102.

In a configuration and manner of operation that would be understood by those skilled in the art, the telephony circuitry 320, Codec 321 and DSP circuitry 322 cooperate and interact to perform the functions which include, but are not limited to, those mentioned above. By way of example, in accordance with the preferred embodiment of the present invention: the Codec 321 connects to and communicates with the DSP 322 through Codec signal bus 316; signal bus 318 carries analog signals which originate from a telephone company central office (i.e., part of the PTN 108) and which are received by the fax interface device 102 through the accessory telephone line 109; the Codec 321 de-modulates the analog signals and produces digital representations of the analog signals which are communicated, through Codec signal bus 316, for analysis by the DSP 322; the analog signals commonly include, for example and not limitation, dial tone signals, DTMF signals and fax tone signals; after the digital representations of the analog signals are analyzed and identified by the DSP (according to programming stored within ROM memory of the DSP circuitry), the DSP determines whether or not a response is necessary and, if so, determines the appropriate response to the analog signal; the DSP 322, to respond, generates appropriate digital signals which are modulated by the Codec 321 to produce analog signals which are output along signal bus 318 to the telephone circuitry 320 and eventually to the fax line 107; according to the preferred embodiment, the Codec 321 can modulate and de-modulate analog signals in the Bell 202 communication format (which is a standard AT&T frequency shift key communication scheme) and in the V.21 communication format (which is a standard CCITT Group 3 fax negotiation and control procedure).

As an example of the interaction between the Codec 321 and the DSP circuitry 322, consider a sender wishing to communicate a document to a desired recipient via fax/E-mail, in accordance with the preferred embodiment of the present invention. Reference may be had here to the process charts and description related to FIGS. 9A-9C. In response to the entry of the "GO" command at the fax interface device 102 by the sender, the fax interface device 102 and, hence, the DSP circuitry 322 (according to step 924 (FIG. 9B) of the preferred method described below) establishes a telephonic connection with the Fax-Server 110 by calling the Fax-Server via telephone line 107. To do so, the DSP circuitry 322 must monitor the signal bus 318 (which reflects the activity on accessory phone line 109, which is the extension of fax line 107) for the presence of an analog dial tone signal by analyzing digital representations (produced by the Codec 321 and communicated to the DSP circuitry 322 through Codec signal bus 316) of the analog signals. Upon receiving and identifying the dial tone signal, the DSP circuitry 322 responds in accordance with programming residing in memory portions of the DSP circuitry to generate DTMF digits corresponding to the telephone number of the Fax-Server 110. After receiving digital representations of the digits of the telephone number from the DSP 322 through Codec signal bus 316, the Codec 321 modulates the digital data to produce the appropriate DTMF digits for output, through signal bus 318, to the telephone circuitry 320 and, ultimately, to telephone line 107. Note that the Codec 321 and the DSP circuitry 322 cooperate in many other instances, using similar hand-shaking methods, to communicate signals to and from the PTN 108 via telephone line 107 (and accessory line 109) in order to provide the functionality necessary for the fax interface device 102 and, hence, the Fax/E-mail communication system 100, to communicate documents to E-mail recipients.

Figure 7:
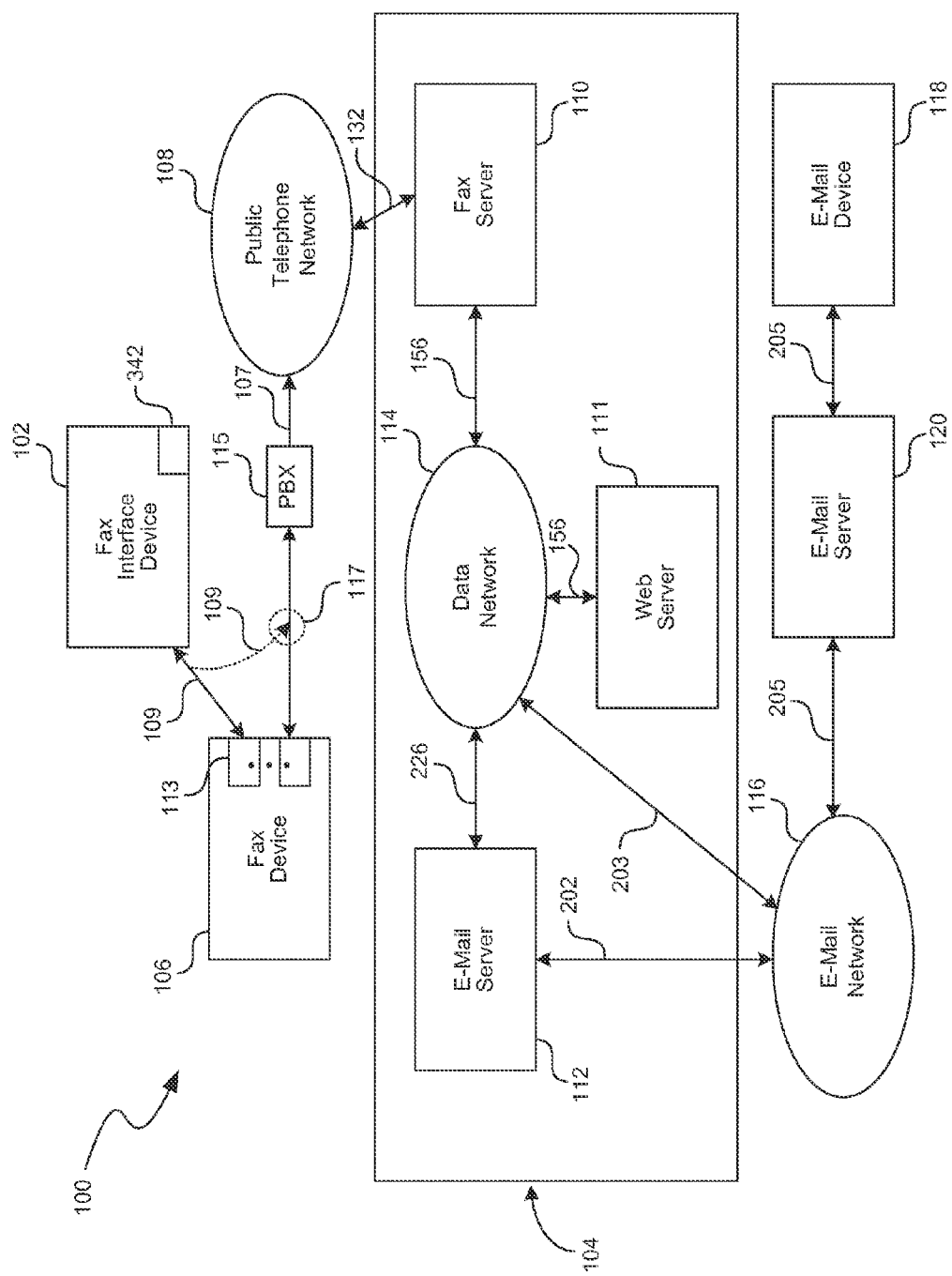
FIG. 7 is a block diagram of a facsimile-to-electronic mail communication system according to an alternative embodiment of the present invention.

According to an alternate embodiment of the present invention shown in FIG. 7, a fax interface device 102' and a fax device 106' connect to a private branch exchange (PBX) 115 before connecting to the Public Network 108'. It will be understood that the common communication line 107, in this alternate embodiment, is a PBX line providing dial tone generated at the PBX 115 and functioning, for purposes of the present invention, similarly to the CO line 107 of FIG. 1. It should be understood that the scope of this alternate embodiment of the present invention includes a fax interface device 102' incorporated into a PBX 115. It should also be understood that the alternate embodiment of FIG. 7 in a manner substantially similar to the preferred embodiment, comprises fax devices 106' including any fax-capable devices, including for example and not limitation, conventional facsimile machines, multi-function machines which can operate as fax machines, or image scanners which can operate as fax sending devices.

In accordance with other alternate embodiments of the present invention, the Public Telephone Network 108 and E-mail network 116 are replaced by any of a variety of different interconnecting networks, including any combination of public, private, switched, non-switched, wireline, non-wireline, digital, analog, in-band signaling, out-of-band signaling, voice, data, local or wide area networks. In addition, although DTMF signaling and transfer of information through DTMF and data signaling formats are disclosed in the preferred embodiment of the present invention, other alternate embodiments of the present invention include methods and apparatus which accommodate signaling and transferring of information through alternate signaling networks and formats, including modem communications, integrated services digital network (ISDN) and other out-of-band and in-band signaling methods, whereby signals and information are communicated between a FEM-GATEWAY 104 and a fax interface device 102. According to still other alternate embodiments of the present invention, the apparatus of the Fax/E-mail communication system 100 comprises a FEM-GATEWAY 104 which employs only one computer that includes necessary hardware, and executes necessary programs present on the Fax-Server 110 and the E-mail-Server 112 of the preferred embodiment of the present invention. In still other alternate embodiments of the present invention, the apparatus of the Fax/E-mail communication system 100 comprises multiple computers, which include the necessary hardware and software present on the Fax-Server 110 of the preferred embodiment, and multiple computers which include the necessary hardware and software present on the E-mail-Server 112 of the preferred embodiment. It should be understood that it is within the scope of the present invention that indicated subsystems (servers 110, 112, 111) of the FEM-GATEWAY 104 are, acceptably, either geographically separated or geographically co-located.

Represented in FIGS. 1 and 11, is a Web Server 111, 111'. The Web Server 111, 111' is an optional computer (or computer based program) which provides user access to information regarding transactions processed through the FAX/E-mail communication system 100. The Web Server communicates with the Fax-Server 110 and the E-mail Server 112 over data network 114. As will be understood by those skilled in the art, a Web Server provides access to users using computers connected to a data network (such as the Internet) for the purpose of accessing information from and interacting with computers connected directly or indirectly to the Web Server. By way of example, the Web Server 111, 111' permits a user of the communications system 100 access to information on their account such as accounting information, billing information, service information, as well as current and historical data on Fax-to-E-mail transactions generated from the user's fax device 102. Additionally, the Web Server permits a user to interact with the communication system 100 to add, delete, or change user preferences. By way of example, a user could change a passcode, or the priority of a pending Fax-to-E-mail message.

Figure 8:
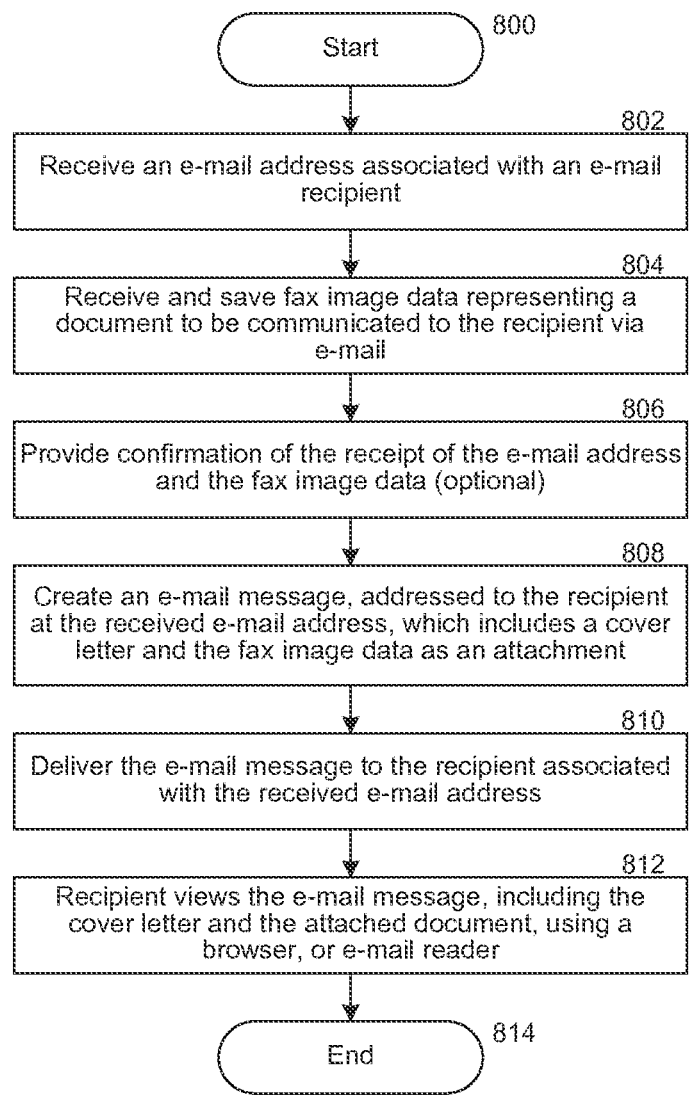
FIG. 8 is a flow chart depicting an overview of a preferred method of the present invention.

FIG. 8 displays an overview of a preferred method of the present invention and illustrates a plurality of steps which are necessary to communicate a hard-copy document (also referred to herein as a "document" and including any item which can be communicated by a fax device 106 or equivalent thereof) to a desired recipient using the Fax/E-mail communication system 100 disclosed herein. The individual steps of the method are performed by various elements, and combinations of elements, of the system 100 working in concert and are detailed by the figures that follow. After starting at step 800, the method proceeds to step 802 where the system 100 receives, from the sender of the document, an E-mail address which has been previously associated with, or assigned to, the desired recipient of the document and, optionally, saves the recipient's E-mail address for future use. According to the preferred embodiment of the present invention, the recipient's E-mail address is input, or recalled from memory storage, to the system 100, by the sender of the document through interaction with the telephone-style keypad 342 of the sender's fax interface device 102 connected to the PTN 108. Continuing at step 804, the system 100 receives and saves fax image data which is generated by the sender's fax device 106 and which represents the document to be communicated to the desired recipient via E-mail. The fax image data is, typically, created by asasterizing process performed at the sender's fax device 106 by hardware, by software, or by cooperation between hardware and software and is, typically communicated in what is known as "G3 protocol", all of which is well-known to those skilled in the art. Upon receiving and storing the fax image data, the system 100, at step 806, provides an optional confirmation (sender selectable) to the sender which indicates that the E-mail address and fax image data have been received by the system 100. The confirmation is, for example, in the form of a single page which is transmitted by the FEM-GATEWAY 104 for receipt by the sender's fax device 106 as if the confirmation were a conventional fax document received by the sender's fax device 106. An alternative manner of providing confirmation to the sender is to update the Web Server 111 in a manner that allows the sender of the original facsimile (who is a registered user of the communication system 100) to access information at the Web Server which will indicate the status of facsimile-to-E-mail messages which that sender has sent through the system. Still other alternative methods of sending confirmation are acceptable, such as, for example, providing a notice of the successful delivery to a registered sender's E-mail address. Advancing to step 808, the system 100 creates an E-mail message 270, addressed to the recipient at the previously received E-mail address, which includes a message portion 272 and an attached image data file 274 containing the previously received fax image data stored in an industry-standard format for storing graphical data. In accordance with the preferred embodiment, encoding of the attachment 274 is also performed at this step (as well as, optionally, the earlier mentioned image processing). The processes of attaching an image data file 274 to an E-mail message 270 (for example, compliant with MIME encoding), of storing graphical data in industry-standard formats and encoding the file are considered to be well-known to those skilled in the art. At step 810, the system 100 delivers the E-mail message 270 to an E-mail network 116, with its associated image data in attached, preferably encoded, image data file 274, for delivery to the E-mail address associated with the recipient and included in the message portion 272. Once the recipient receives the E-mail message 270, the recipient, at step 812, views the E-mail message 270, including its message portion 272. Viewing of the attached document (represented by the fax image data of the attached image data file 274), through conventional use of an appropriate computer program known as "browser", "viewer", or "e-mail reader" is accomplished, at least, by "clicking" on the file attachment located in the handle portion 298 located in the attachment portion 284 of the message portion 272. (See discussion above regarding FIG. 5). After viewing of the E-mail message 270 by the recipient, the method ends at step 814. In accordance with the preferred embodiment of the present invention, because the attachment 274 has been converted to a widely popular image format (e.g., TIFF) which is, desirably, compatible with a majority of browsers and E-mail readers in the then current market, and because the image data file is appropriately encoded, then, in accordance with the preferred embodiment of the present invention, viewing is accomplished by simply "clicking" on the file attachment handle portion 298 found in the attachment portion 284 of the message portion 272 of the E-mail message 270). When the E-mail device 118 is operating a browser or E-mail reader which is not immediately compatible with the image data format/encoding into which the attachment has been converted/encoded, it is understood that additional user interaction will be necessary to appropriately decode the attachment prior to viewing.

In order to enable Fax-to-E-mail service by performing some of the various steps of the plurality of steps described above with respect to FIG. 8, the fax interface device 102 of the present invention executes a front end process 830 and the Fax-Server 110 executes a process 1020, which shall be referred to herein as the COMCON process 1020. FIGS. 9 and 11, respectively, display the front-end process 830 and the COMCON process 1020 in accordance with the preferred method of the present invention.

Figure 9A:
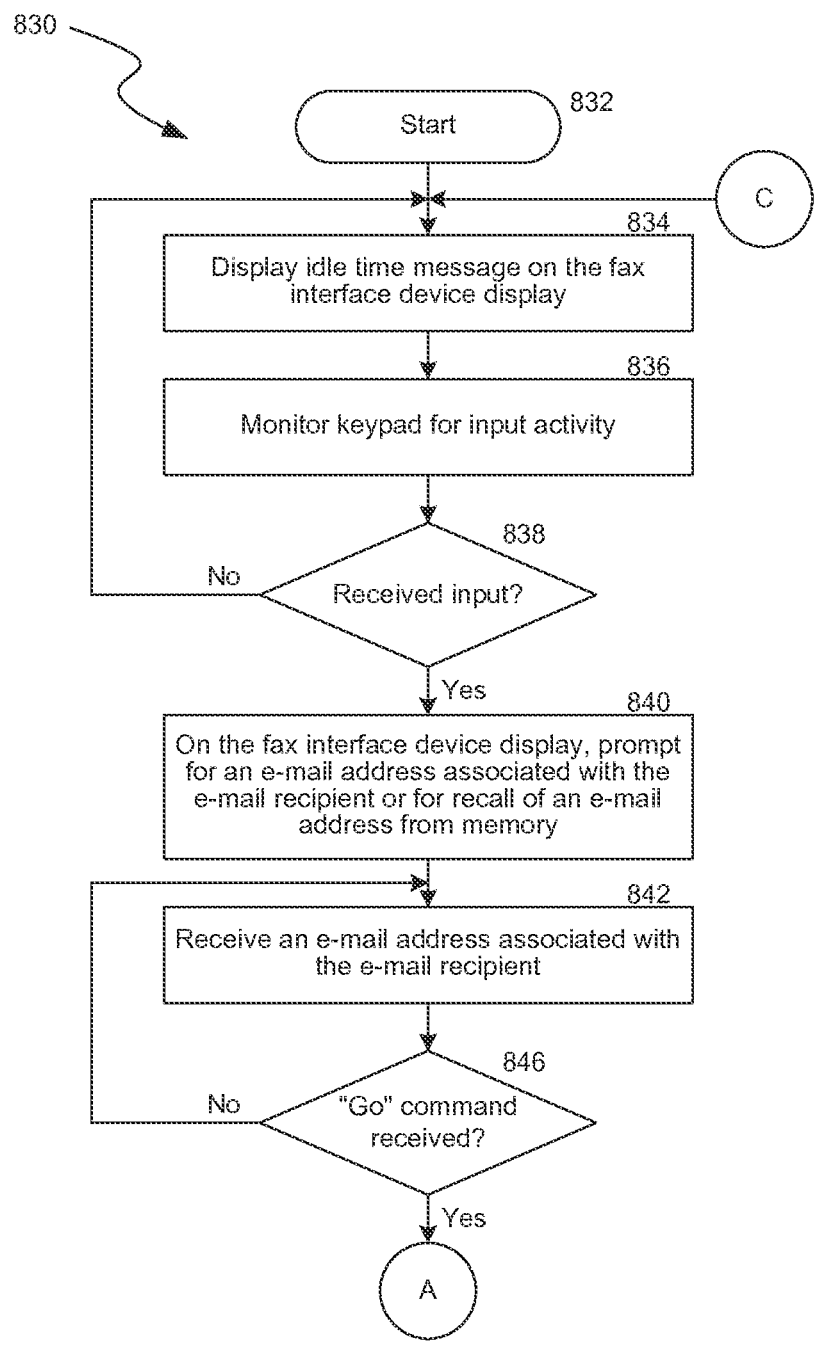
FIG. 9A is a flow chart of the front end process depicting the facsimile-to-electronic mail communication system waiting for user input.

Referring now to FIG. 9A, the front-end process 830 starts at step 832 and advances to step 834 where the fax interface device 102 shows an idle-time message on its display 344 while the fax interface device 102 waits for a sender wishing to communicate a document to a recipient via E-mail. (The idle-time message might include, for example, information identifying the manufacturer of the fax interface device 102, information instructing a user on how to send a document to a recipient via E-mail, information advertising other available services, etc.) At step 836, the fax interface device 102 monitors the keypad 342 for input activity to detect input by a user and potential sender of a Fax-to-E-mail document. Preferably, the Fax-to-E-mail command includes DTMF digits entered at the fax device's keypad 342; for example, entry of the keystrokes "A", or "QDial". (Refer, please, to FIG. 10A for further keypad details). Next, at step 838, the fax interface device 102 determines whether or not it has received input at the keypad 342. If input has not been received by the fax interface device 102, the front-end process 830 loops back to step 834 and again displays an idle-time message. If input has been received by the fax interface device 102, the fax interface device 102, at step 840, prompts the sender for an E-mail address associated with the desired recipient of a document by displaying prompt text, on display 344, which instructs the sender to enter an E-mail address for the recipient or to recall a previously stored E-mail address from fax interface device 102 memory. After prompting the sender to enter an E-mail address, the fax interface device 102 (at step 842) receives the characters of the E-mail address input by the sender, displays the characters, as they are received, on display 344, and retains the E-mail address for future use (stored in memory).

Figures 10, 10A:
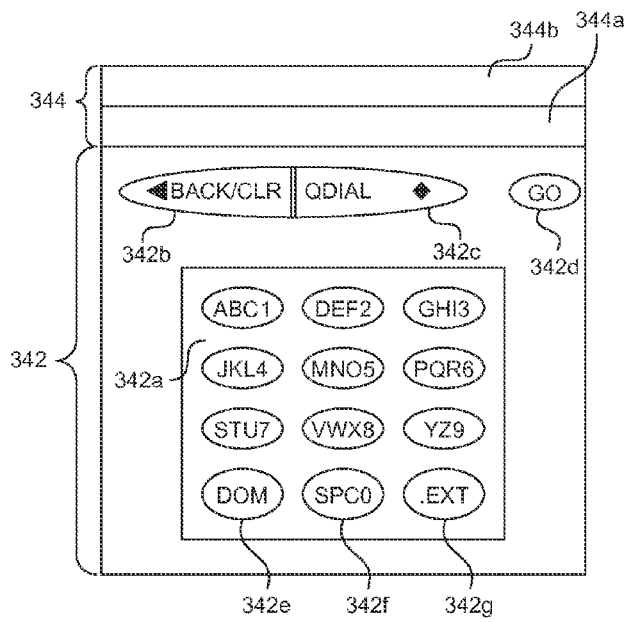
FIG. 10 is a chart displaying a column of alphanumeric and other characters with suffixes commonly encountered in E-mail addresses used by the present invention.
FIG. 10A is a schematic diagram of a fax interface device user keypad.

According to the preferred method of the present invention and as previously noted, an E-mail address associated with a desired recipient is input by the sender (at step 842), using the telephone-style keypad 342 of the sender's fax interface device 102, after being prompted for the recipient's E-mail address on a first row (or line) (e.g., the bottom line 334*a*) of display 344. Because the standard telephone keypad as represented by keypad 342 are restricted to 12 input keys 342*a*, multiple alphanumeric characters must be associated with each one of the 12 available keys 342*a* to provide all characters required to create a valid E-mail address. This is accomplished by associating characters with keys 342*a* either in alphabetical, numeric, or common trait order such that a sender can "spell" an E-mail address using the reduced-set keypad 342 without limitation to the required character set. In accordance with the preferred embodiment of the present invention, the sender enters the recipient's E-mail address using the fax interface device's keypad 342 (FIG. 10A) and using the character association chart of FIG. 10 as a guide. FIG. 10 displays an association and sequence chart showing the available characters (Col. 1), the associated key (Col. 2), and the input sequence to advance to the desired character (Col. 3). In addition to singular characters being associated with a particular key 342*a*, groups of characters commonly used in the creation of E-mail addresses are also associated with particular keys to simplify the steps required for user input, and in addition, certain other groups of characters such as, for example, email suffixes .com, .net, .gov, .org, .edu are stored in memory and associated with the EXT key 342*g*. Frequently dialed domains, for example, aol.com. prodigy-.com. netcom.com. worldnet.com are stored in memory and associated with the DOM key 342*e*. To advance through the available characters associated with a particular key, the sender repeatedly presses the desired key, without pause (timeout). The character in sequence associated with the key will be displayed on a second line (e.g., the top line 344*b*) of display 344. Once a time-out occurs, the fax interface device 102 will settle upon the selected character or group of characters, and will display the selected character and move to the next cursor position. This process permits multiple characters associated with the same key to be selected simply by pausing momentarily between key presses for greater than the allowable timeout period. For example, to enter an "A", the sender presses the "ABC1" key one time. To enter a "C" the sender presses the "ABC1" key three times. To enter "AC" the sender presses the "ABC1" key one time, pauses one second, and presses the "ABC1" key three times. Continued pressing of a character key scrolls the characters in a endless-loop fashion. The BACK/CLR 342*b* is character destructive key and deletes the last character input (or character group) and backspaces the cursor one position in sequence for each time the button is pressed. Pressing the BACK/CLR 342*b* button for extended time (2 seconds or more) deletes an entire entry and returns the user to the idle state condition or can be used in deleting characters or groups of characters stored in memory. QDIAL button 342*c* is used to store E-mail addresses which can be recalled rapidly from memory and eliminates the repetitive input of commonly used E-mail addresses during the addressing process. With the cursor at its first position on the display 344 of the fax interface device 102, the fax interface device begins accepting keypad entries and each time the sender waits more than the preset time (e.g., one second), the interface device records a "time-out". If the sender presses a single key 342*a* repeatedly before there is a time-out, then the fax interface device will select the respective character or character group from the chart of FIG. 10 corresponding to the number of times the key was pressed. The fax interface device will consider the address entry to be complete when the sender has pressed the "GO" button 342*d*.

Figure 9B:
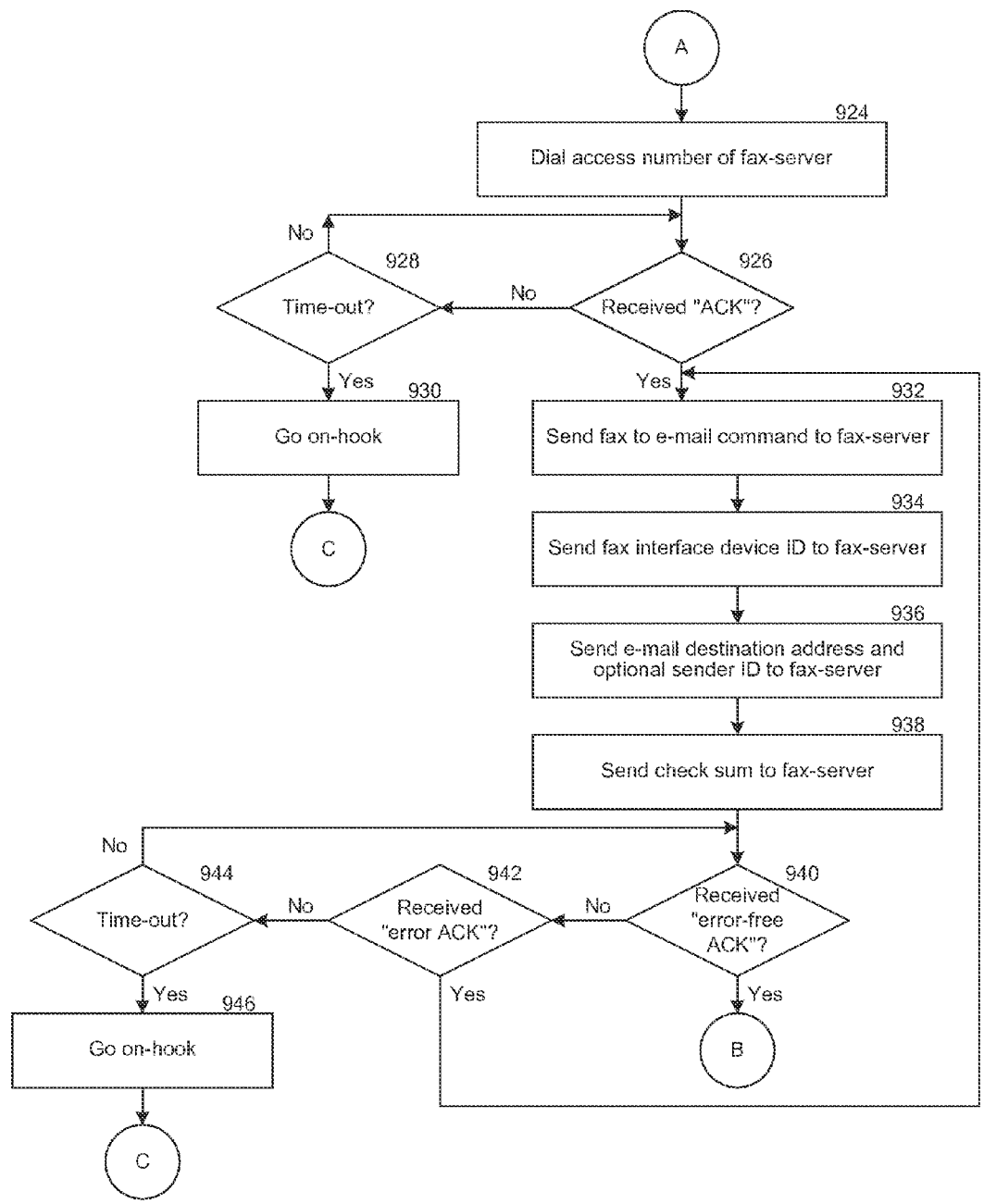
FIG. 9B is a flow chart of the front end process depicting the facsimile-to-electronic mail communication system interfacing with the fax server.
Figure 9C:
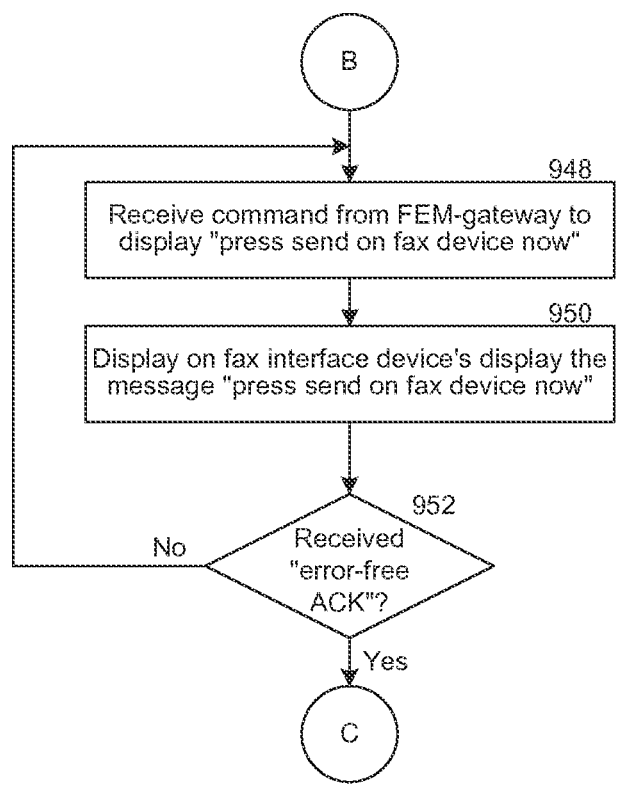
FIG. 9C is a flow chart of the front end process depicting the facsimile-to-electronic mail communication system receiving a message from the FEM-GATEWAY.

Upon completion of the entry of the E-mail address, the sender presses the "GO" button 342*d* on the keypad 342 to begin a process whereby the interface device 106 interacts with the Fax-Server 110 of the FEM-GATEWAY 104 to forward the received E-mail address and to pre-condition the FEM-GATEWAY system for delivery of the fax image data from the fax device 106. With further reference to FIGS. 9A-9C, once the "GO" command is received (see step 846), the interface device 102 goes off-hook and dials the FEM-GATEWAY 104 (step 924). To facilitate interaction between the Fax-Server 110 and the fax interface device 102, a process (see COMCON process 1020 of FIG. 11) executes on the Fax-Server 110 which is complimentary to the following process executing on the fax interface device 102 and the two processes communicate through the fax line 107 (and accessory line 109), public network 108, communication link 132 and a fax communication interface 130, as described below, to deliver to the Fax-Server 110 the E-mail address associated with the desired recipient. To that end, it can be seen that steps 924 through 950 of FIG. 9B-9C are complimentary to and inter-communicate with steps 1026 through 1057 of FIG. 11.

The fax interface device 102 continues its processing at step 926 where the fax interface device monitors the communications with the Fax-Server 110 to determine whether or not an acknowledgment "ACK" as been received from the Fax-Server 110. If not, the process 830 branches to step 928 where the fax interface device 102 determines whether or not a time-out condition exists (i.e., the fax interface device 102 has been waiting for an "ACK" for an excessive period of time). If the fax interface device 102 has determined that a time-out condition exists, the fax interface device 102 goes on hook, at step 930, without communicating the recipient's E-mail address nor the fax image data to the Fax-Server 110. If the fax interface device 102 determines, at step 928, that a time-out condition does not exist, the front-end process 830 loops back to step 926. If, at step 926, the fax interface device 102 detects an "ACK", the process 830 advances to step 932 where the fax interface device 102 sends a Fax-to-E-mail command to the Fax-Server 110. Then, the fax interface device 102 sends, at step 934, its unique identification code (ID) to the Fax-Server 110. Advancing to steps 936 and 938 of the front-end process 830, the fax interface device 102 sends the recipient E-mail address, received previously from the sender, optionally, the sender's ID, and a check sum to the Fax-Server 110. At step 940, the fax interface device 102 determines whether or not an "error-free ACK" has been received from the Fax-Server 110 on fax line 107. If so, the front-end process 830 continues at step 948 described below. If not, the process 830 branches to step 942 where the fax interface device 102 determines whether or not an "error ACK" has been received from the Fax-Server 110 on fax line 107 instead of an "error-free ACK". If the fax interface device 102 determines that a "error ACK" has been received (i.e., indicating that the Fax-Server 110 is requesting that the fax interface device 102 re-send the fax-to-E-mail command, its own identification code, the recipient's E-mail address, and an associated check sum), the front-end process 830 loops back to step 932. If the fax interface device 102 determines that an "error ACK" has not been received, then the process 830 moves to step 944 where the fax interface device 102 determines whether or not a time-out condition has occurred. If not, the process 830 loops back to step 940 to continue waiting for an "ACK". If so, the fax interface device 102 goes on-hook and the front-end process 830 returns to its "idle time".

According to the preferred method of the present invention, and as seen in FIG. 9C, the fax interface device 102, at step 948, receives a message from the FEM-GATEWAY 104 to display the message "PRESS SEND ON FAX DEVICE NOW", and the message is displayed (see step 950) at the fax interface device's display 344. Next, at step 952, the front-end process 830 determines if there is a drop or absence of CO line current. For example, in the preferred embodiment where the fax interface device 102 is connected by line 109 to the accessory phone RJ-11 jack on the fax device 106, then, in accordance with standard functioning procedures, the connection of the fax line 107 to the accessory line 109 will be "locked out" and the accessory line 109 will "go dead"—this is the "absence of CO line current" to be determined at step 952. If no CO line current is detected, the process returns to "idle time". Alternately, for example, in an embodiment where the connection between accessory line 109 and fax line 107 is not automatically locked-out by activation of the fax device 106 SEND command (e.g., connection of accessory line 109' at line splitter 117), then step 952 is, for example, replaced by the decision step of "detect fax tones?", and, if fax tones are detected, the fax device 102. is placed on-hook and the process 830 returns to "idle time" at step 834.

As mentioned above, a process referred to herein as the COMCON process 1020 (see FIG. 11) executes on the Fax-Server 110; and, in accordance with preferred embodiments of the invention, a separate COMCON process 1020 services each fax communication channel of a fax communication interface 130 (see FIG. 2) of the Fax-Server 110 by communicating, in a hand-shaking manner, with a front-end process 830 (see FIGS. 9B, 9C) of a fax interface device 102 when a sender attempts to communicate a document via E-mail to a recipient.

Figure 11A:
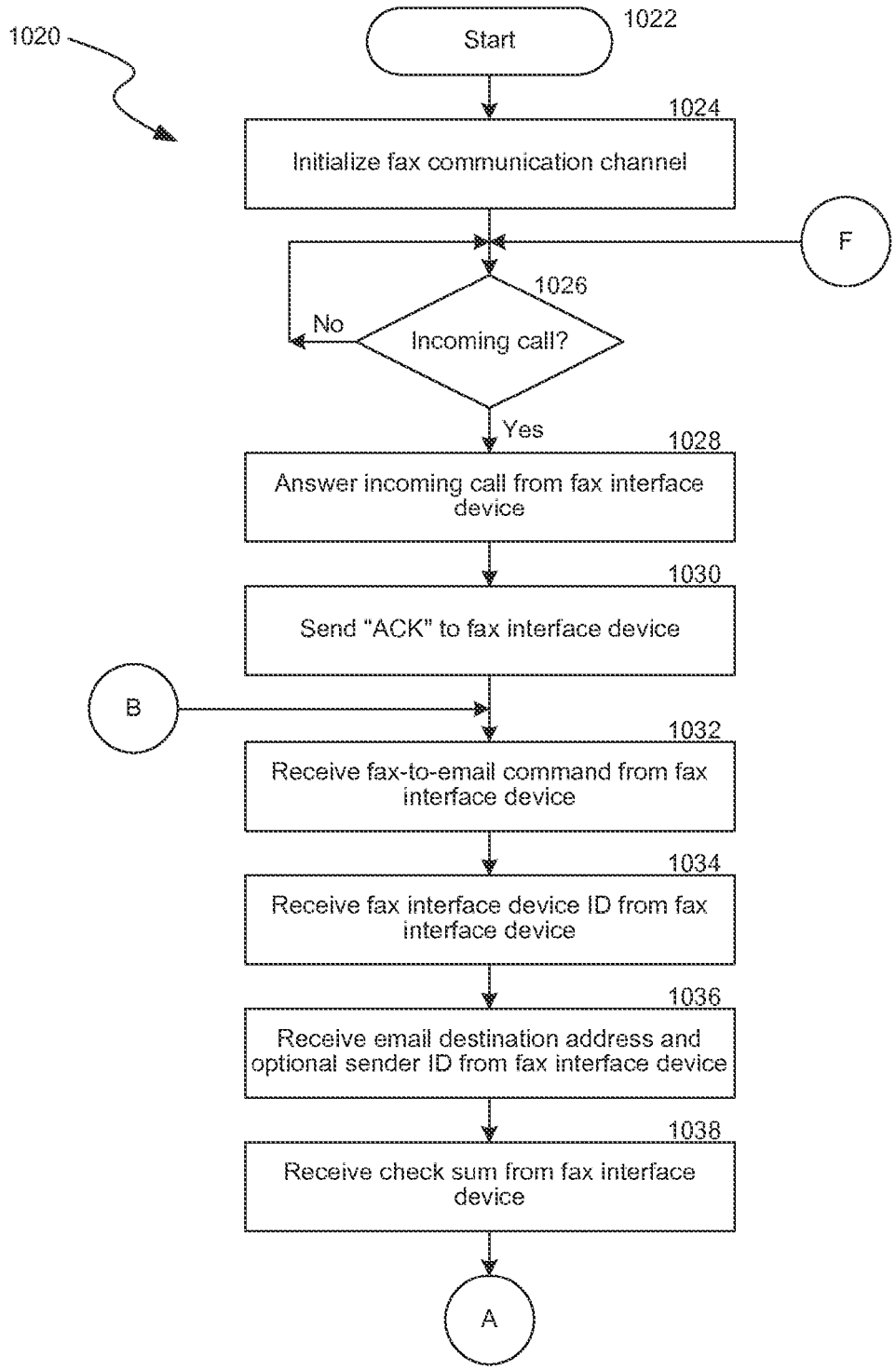
FIG. 11A is a flowchart of the COMCON process in accordance with the preferred method of the present invention.
Figure 11B:
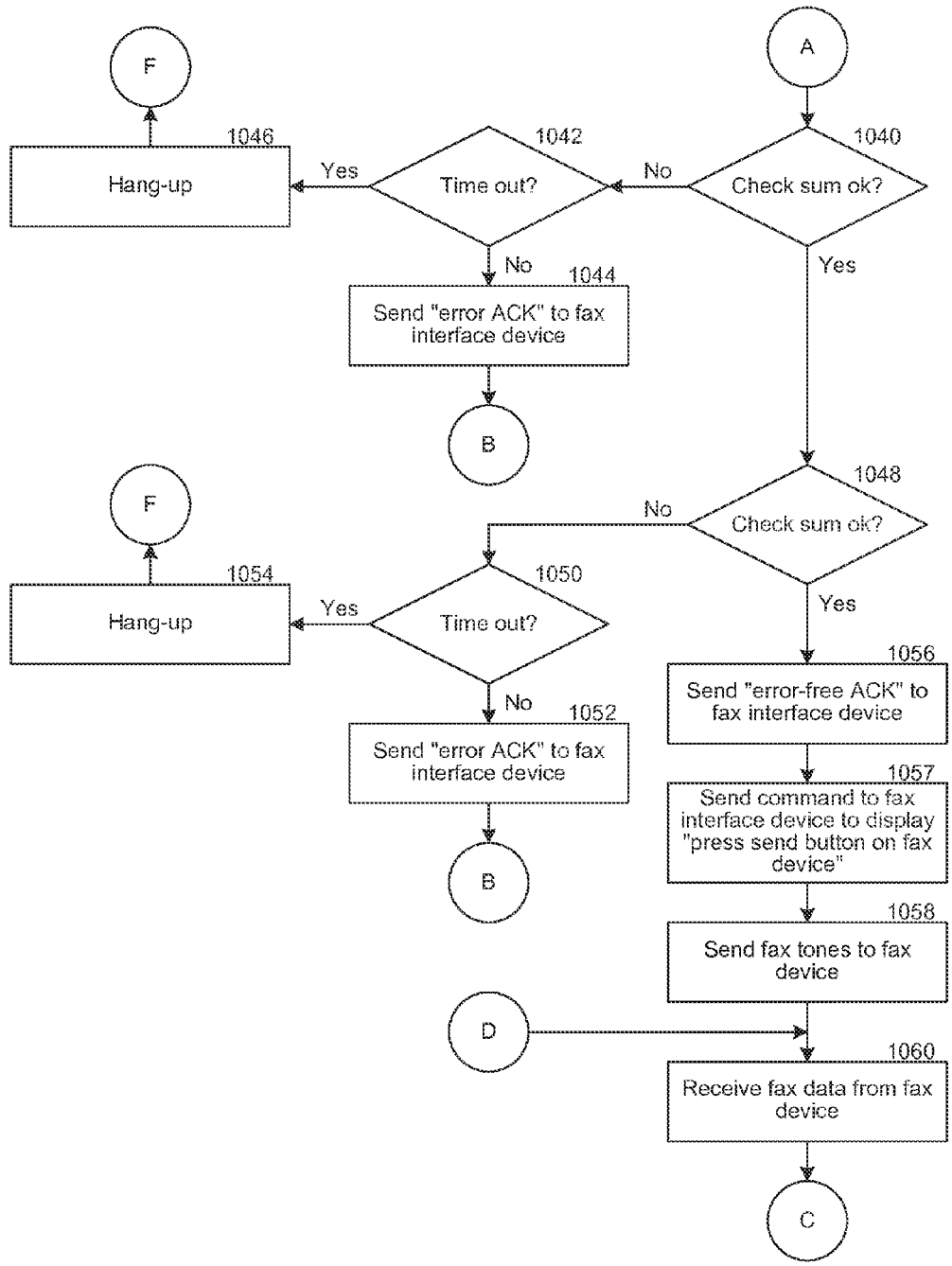
FIG. 11B is a flowchart of the COMCON process in accordance with the preferred method of the present invention specifically illustrating the check sum matching process.
Figure 11C:
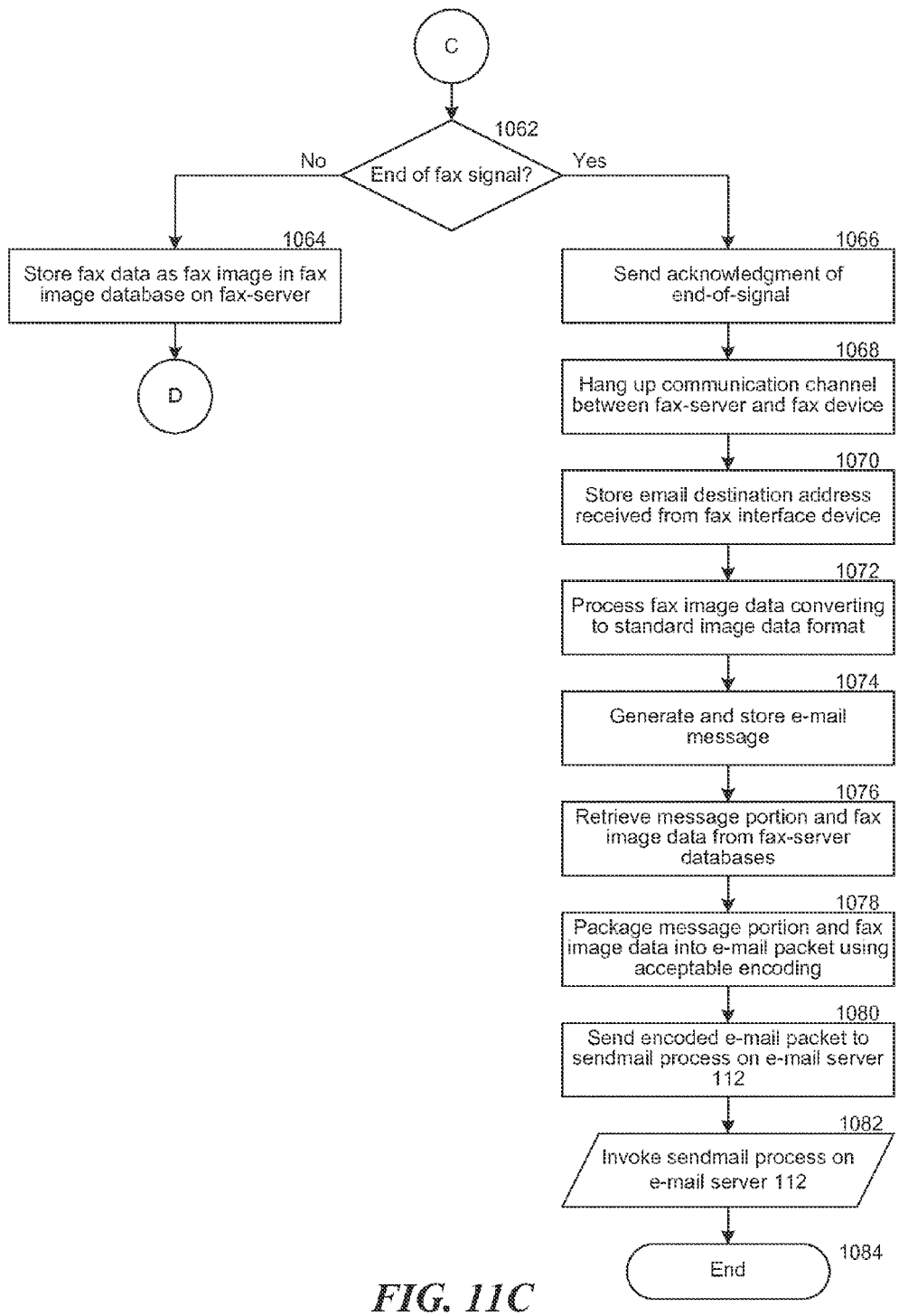
FIG. 11C is a flowchart of the COMCON process in accordance with the preferred method of the present invention specifically illustrating the end of signal determination process.

FIGS. 11A-11C display a COMCON process 1020 in accordance with the preferred method of the present invention. The COMCON process 1020 is started at step 1022. After starting, the COMCON process 1020 advances to step 1024 where the fax communication interface 130 and fax communication channel associated with the COMCON process 1020 are initialized. Then, at step 1026 of the COMCON process 1020, the Fax-Server 110 determines whether or not an incoming telephone call has been received from the public telephone network (PTN) 108 on the fax communication channel serviced by the COMCON process 1020. If the Fax-Server 110 determines that no incoming call is present, the COMCON process 1020 loops back to step 1026 to continue waiting for an incoming call. If the Fax-Server 110 determines that an incoming call is present, the COMCON process 1020 advances to step 1028 where the Fax-Server 110 answers the incoming telephone call from a fax interface device 102. Next, at step 1030, the Fax-Server 110 sends an acknowledgment "ACK" to the fax interface device 102 through the fax communication interface 130, the public telephone network 108, and the fax line 107 (and the accessory line 109). The "ACK" informs the fax interface device 102 that the Fax-Server 110 has received its telephone call and that the Fax-Server 110 is ready to interact with the front-end process 830 of the fax interface device 102.

Once communication has been established with a calling fax interface device 102, the COMCON process 1020 advances to step 1032 where, as seen in FIG. I 1A, the Fax-Server 110 receives a fax-to-E-mail command from the fax interface device 102. Then, at step 1034, the Fax-Server 110 receives the identification code of the calling fax interface device 102 followed, at step 1036, by receipt of the E-mail address, and optionally the sender ID as input by the sender on the fax interface device 102. Continuing at step 1038, the Fax-Server 110 receives a check sum from the fax interface device 102. Advancing to step 1040 (FIG. 11B) of the COMCON process 1020, the Fax-Server 110 determines whether or not the check sum matches (i.e., is okay) a check sum which it has computed based upon the data received during steps 1032 through 1038. If the Fax-Server 110 determines that the check sum is not okay (i.e., there was an error during communication with the fax interface device 102), the COMCON process 1020 branches to step 1042 where the Fax-Server 110 determines whether or not a time-out condition exists (i.e., determines whether or not a maximum number of re-send requests have been exceeded). If no time-out condition exists, the Fax-Server 110, at step 1044, sends a an "ERROR ACK" command to the fax interface device 102 to request that the fax interface device 102 re-send the data referred to in steps 1032 through 1038 described above. The COMCON process 1020 then loops back to step 1032. If the Fax-Server 110 determines, at step 1042, that a time-out condition exists, the COMCON process 1020 causes the fax communication interface 130 to go on-hook, thereby hanging-up the telephone call from the fax interface device 102, before looping back to step 1026.

Referring back to step 1040, if the Fax-Server 110 determines that the check sum is okay (i.e., there was no error during communication with the fax interface device 102), the Fax-Server 110 determines, at step 1048, whether or not the identification code received from the fax interface device 102 is okay by comparing the received identification code with a list of fax interface device identification codes which are stored in a database of the Fax-Server 110. If the Fax-Server 110 determines that the received identification code is not valid for any fax interface device 102, the COMCON process 1020 branches to step 1050 where the Fax-Server 110 determines whether or not a time-out condition exists (i.e., determines whether or not a maximum number of re-send requests have been exceeded). If no time-out condition exists, the Fax-Server 110, at step 1052, sends a an "ERROR ACK" command to the fax interface device 102 to request that the fax interface device 102 re-send the information received at steps 1032 through 1038. The COMCON process 1020 then loops back to step 1032. If the Fax-Server 110 determines, at step 1050, that a time-out condition exists, the COMCON process 1020 causes the fax communication interface 130 to go on-hook, thereby hanging-up the telephone call from the fax interface device 02, before looping back to step 1026.

If, at step 1048, the Fax-Server 110 determines that the identification code of the fax interface device 102 is okay, the COMCON process 1020 advances to step 1056 where the Fax-Server 110 sends an "ERROR FREE ACK" to the fax interface device 102 to indicate to the fax interface device 102 that it has received a fax-to-E-mail command, a valid fax interface device identification code, and an E-mail address associated with a desired E-mail recipient. The Fax-Server 110 then, at step 1057, sends a command to the fax interface device 102 to display the message "Press Send on Fax Device Now" on the display 344, which instructs the sender to initiate communications with the Fax-Server by pressing the "SEND" (or "START", etc.) button on the fax device 106. The Fax-Server 110 then, at step 1058, sends fax tones along the fax line 107 to the fax device 106 and receives fax data from the fax device 106 at step 1060.

Continuing at step 1062 (FIG. 11 C), the Fax-Server 110, in accordance with the COMCON process 1020, determines whether or not it has received an end-of-fax signal from the fax device 106 connected to the fax communication channel 132 supported by the COMCON process 1020. If no end-of-fax signal has been received, the Fax-Server 110 continues to store the fax data, in its native format (G3) as fax image data in a database on the Fax-Server 110, until such time that either an error or an end of fax signal has been received. The COMCON process 1020 then loops back to step 1060 where the Fax-Server 110 continues to receive fax data from the fax device 106. If the Fax-Server 110 determines, at step 1062, that it has received an end-of-fax signal, the COMCON process 1020 advances to step 1066 where the Fax-Server 110 acknowledges receiving the end-of-fax signal from the fax device 106. In accordance with the preferred method of the present invention, the COMCON process 1020, as seen in FIG. 11C, continues at step 1068 where the Fax-Server 110 COMCON process hangs up the fax communications interface 130 and thereby terminates the call with the fax device 106. The process 1020 continues at step 1070 where the Fax-Server 110 stores the E-mail address sent by the sender of fax interface device 106 in a database on Fax-Server 110. Then at step 1072 the Fax-Server 110 processes the stored fax images received from fax device 106 by converting the images to the formatted image data, being, as mentioned earlier, in a standard image data format for viewing on an E-mail terminal screen. Copies of the converted fax image (the formatted image data) are stored in respective databases on Fax-Server 110. Then, at step 1074, the Fax-Server 110 generates and stores in a database on the Fax-Server an E-mail message portion 272 to accompany the fax image data. The process 1020 advances to step 1076 where the Fax-Server 110 retrieves the message portion 272 and the fax image data from the respective databases on the Fax-Server 110. Then, at step 1078, the Fax-Server 110 attaches the formatted fax image data file 274 to the E-mail message portion 272 and, preferably, encodes the packaged E-mail message 270 an encoding technique acceptable for the intended E-mail network 116. For example but not limitation, the packaged message 270 with message portion 272 and attachment portion 274 is encoded using Internet MIME formatting, thereby creating a MIME E-mail message 270. MIME, or Multi-purpose Internet Mail Extensions, defines the protocol for the Interexchange of text and multi-media E-mail via the Internet (global computer network) and is considered well-known to those reasonably skilled in the art. Continuing at step 1080, the Fax-Server 110 sends the E-mail message 270 to the E-mail server 112 and to the SENDMAIL process 1120 (FIG. 12), over data network 114. After sending the E-mail message 270 to the SENDMAIL process 1120 through interprocess communication, the COMCON process 1020 invokes the SENDMAIL process 1120 on the E-mail server 112, and then the process 1020 ends at step 1084.

Figure 12:
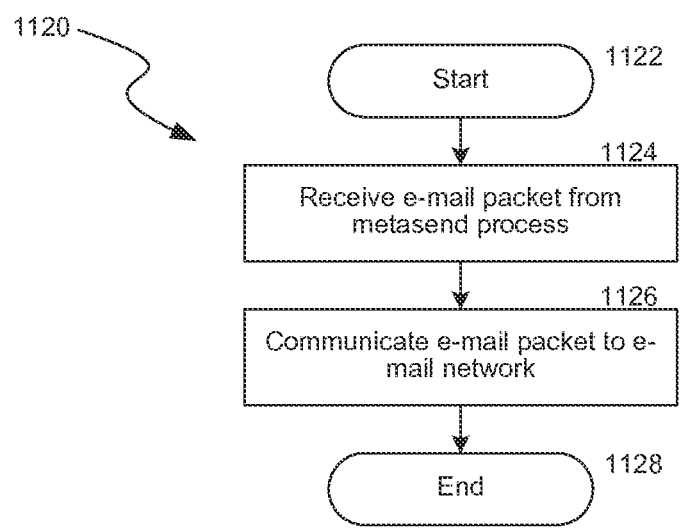
FIG. 12 is a flowchart of a SENDMAIL process in accordance with the preferred method of the present invention.

FIG. 12 displays a SENDMAIL process 1120 which executes on the E-mail-Server 112 in accordance with the preferred method of the present invention. Upon being invoked by the COMCON process 1020 at step 1082 (FIG. 11), being step 1122 of FIG. 12, the SENDMAIL process 1120 advances to step 1124 where it receives the E-mail message 270 from the COMCON process 1020 via interprocess communication. Continuing at step 1126, the SENDMAIL process 1120 directs the gateway E-mail-Server 112 to communicate the E-mail message 270 to the E-mail network 116. Then, at step 1128, the SENDMAIL process 1120 ends.

By way of example but not limitation, in the preferred embodiment, steps 1076-1084 of the COMCON process 1020 are performed in accordance with what is commonly known as the UNIX METAMAIL process, and the SENDMAIL processes 1120 of FIG. 12 are performed in accordance with what is commonly known as the UNIX SENDMAIL process. The UNIX METAMAIL and UNIX SENDMAIL processes are considered well-known to those skilled in the art and are considered to not require further explanation herein.

Once sent to the E-mail network 116, the E-mail message 270 is conveyed in accordance with the handling processes of the E-mail network (such as the Internet Global Computer Network) to, for example, the "mailbox" associated with the recipient address 282. The message 270 is retrieved and viewed as discussed above regarding step 812 of FIG. 8. As previously mentioned, FIG. 5 is an exemplary recipient viewed message portion 272' as would be viewed at an E-mail device 118, with the fields populated with information and data collected, generated, and communicated in accordance with the processes described above.

Figure 13:
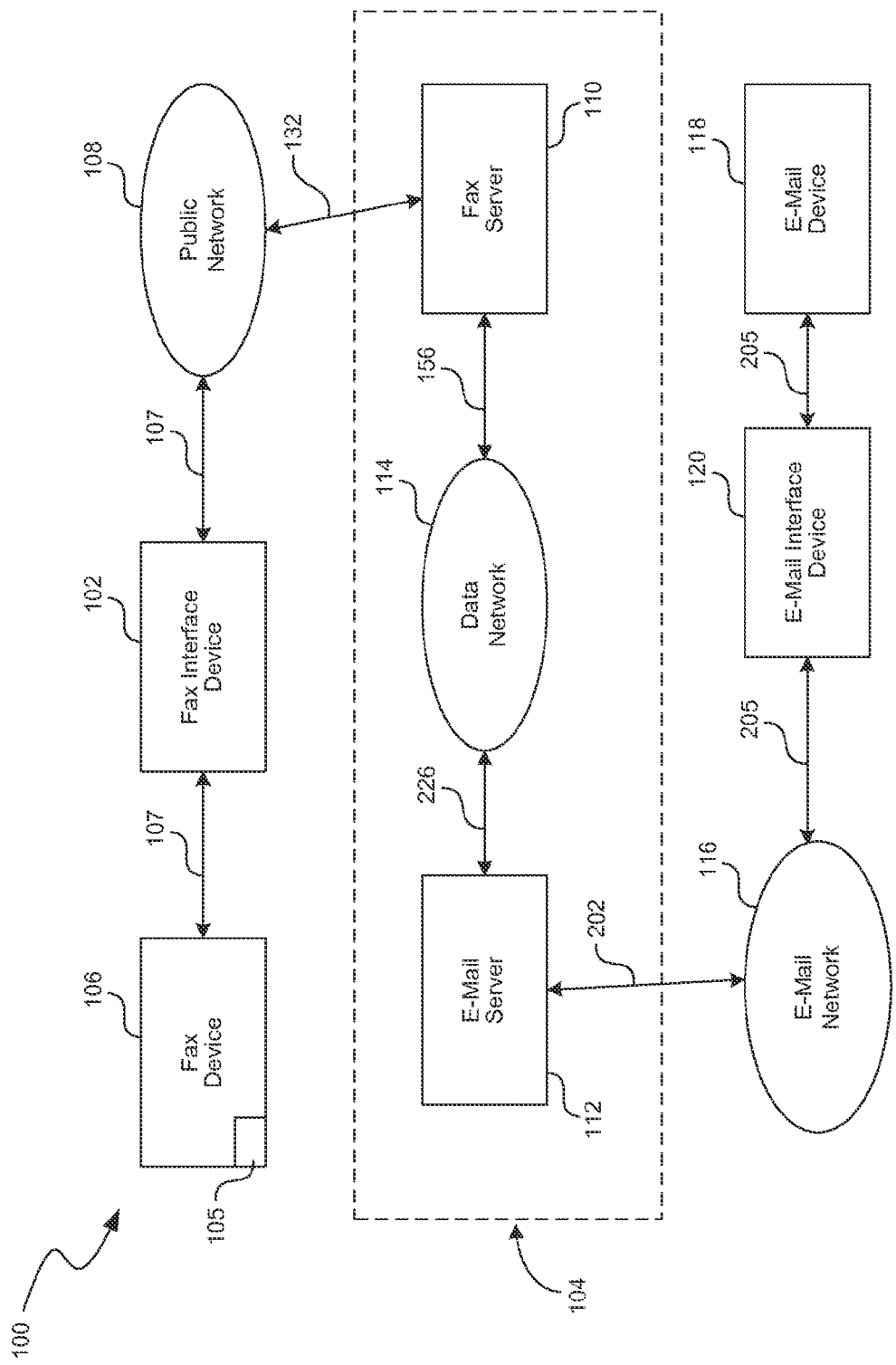
FIG. 13 is a schematic block diagram of a facsimile-to-electronic mail communication system according to an alternate embodiment of the present invention, referred to herein as an in-series embodiment.
Figure 14:
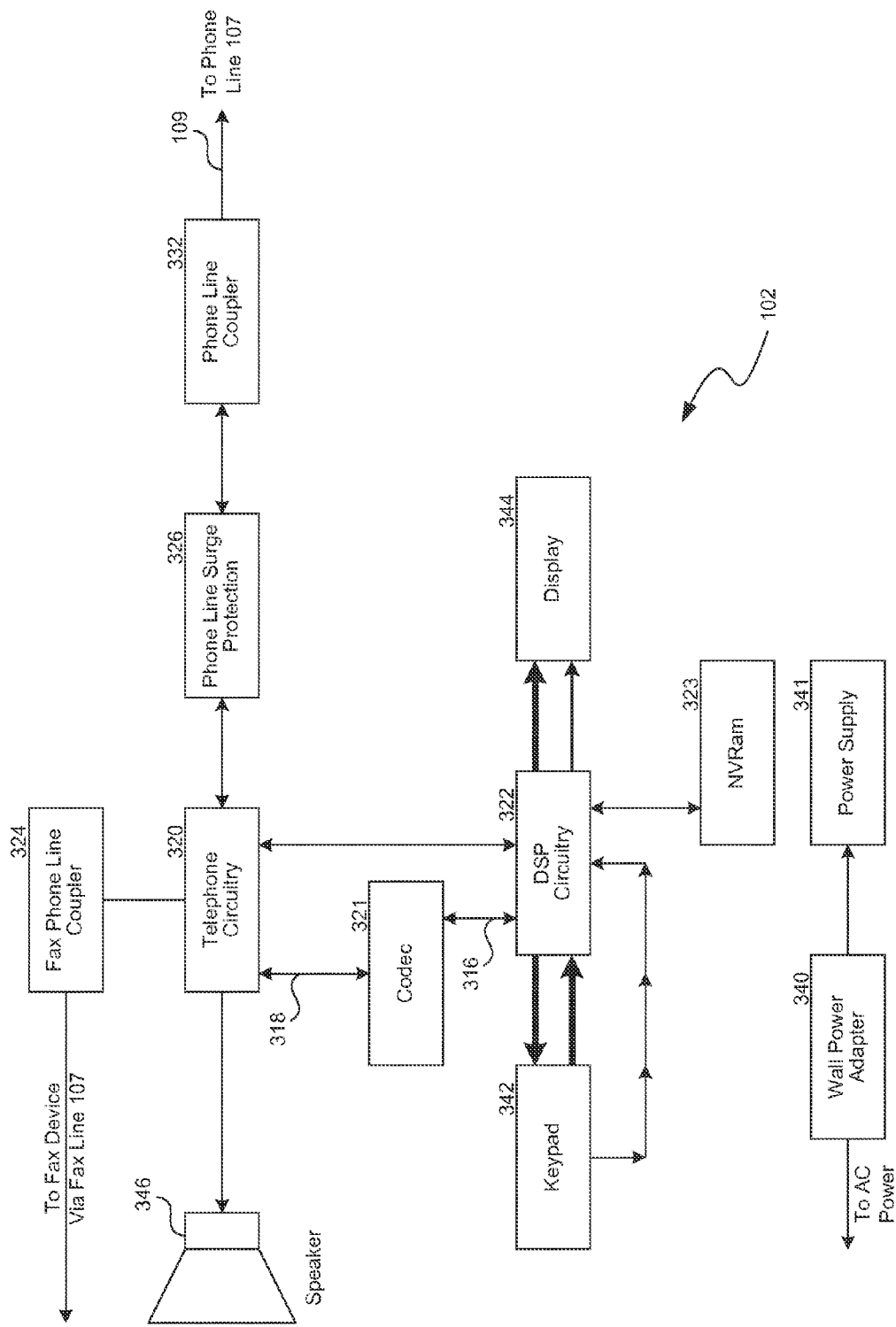
FIG. 14 is a schematic block diagram of a fax interface device of the system depicted in the alternate embodiment of FIG. 13.

In accordance with an alternate, preferred embodiment of the present invention, as depicted in FIG. 13, the fax interface device 102" is placed in what might be termed a "series relationship" on communication link 107 between the fax device 106 and the public network 108 (as opposed to the configuration of the above-described embodiments for which I have used the term "parallel relationship"). An exemplary fax interface device 102" used in accordance with this in-series embodiment of FIG. 13 is depicted in FIG. 14 in schematic fashion. The telephony circuitry 320" of this fax interface device 102" connects through a phone line surge protector and phone line coupler to the public network 108 along phone line 107, and connects through a fax phone line coupler to the fax device 106 along phone line 107'. The DSP circuitry 322" is provided with enhanced processing capability whereby the fax interface device receives and processes signals generated by keystroke entry made at the fax device keypad 105 (thus eliminating the need for a separate keypad at the fax interface device) and whereby the fax interface device 102" acts as an intermediary between the fax device 106 and the public network 108 to separately process signals from each, to electively pass signals from one to the other, and to separately interact with each of the fax device and public network. The operation of this alternate embodiment of FIG. 13 is in accordance with the process outline in connection with FIG. 8 of the previous embodiments. However, in the detailed processing, the fax interface device 102" takes control of the interaction between the fax device 106 and the public network 108 to eliminate the need for user monitoring of the "SEND" function. For example, with reference to FIG. 9A, the fax interface device 102", at step 836, monitors the fax side communication line 107' for activity at the fax device keypad 105, which activity is, for example, in the form of a pre-established entry which alerts the fax interface device 102" that the user at the fax device desires to send a fax-to-e-mail (for example, by entry of the keystrokes "*4"). Absent such fax-to-e-mail alerting entry, the fax interface device 102" would, for example, simply pass communications between the public network 108 and the fax device 106 directly through its telephony circuitry, for example, not interfering with the communication. Once the fax-to-e-mail entry is received, the fax interface device 102" begins with the user similar steps 840 and 842 of FIG. 9A. Furthermore, preferred embodiments of the in-series system 100" maintain control at step 948 (FIG. 9C) such that, rather than receiving a user prompt from the FEM-GATEWAY at step 948 (step 1057 of FIG. 11B), the FEM-GATEWAY sends and the fax interface device 102" receives an acknowledgment signal, in response to which the fax interface device 102" connects a communication channel within its telephony circuitry between the telephone line 107 and the fax phone line 107', and communicates fax tones from the fax server 110 through the communication channel to the fax device. By standard handshaking and delivery techniques, the fax device 106 then delivers its fax data along communication lines 107' and 107, through the fax interface device telephony circuitry, to the fax server 110. When the fax has been completed, the fax interface device 102" detects the end-of-fax signal and communicates the same to the fax-server 110, disconnects communication channel, and awaits a future fax-to-e-mail signal from the fax device 106.

Figure 15:
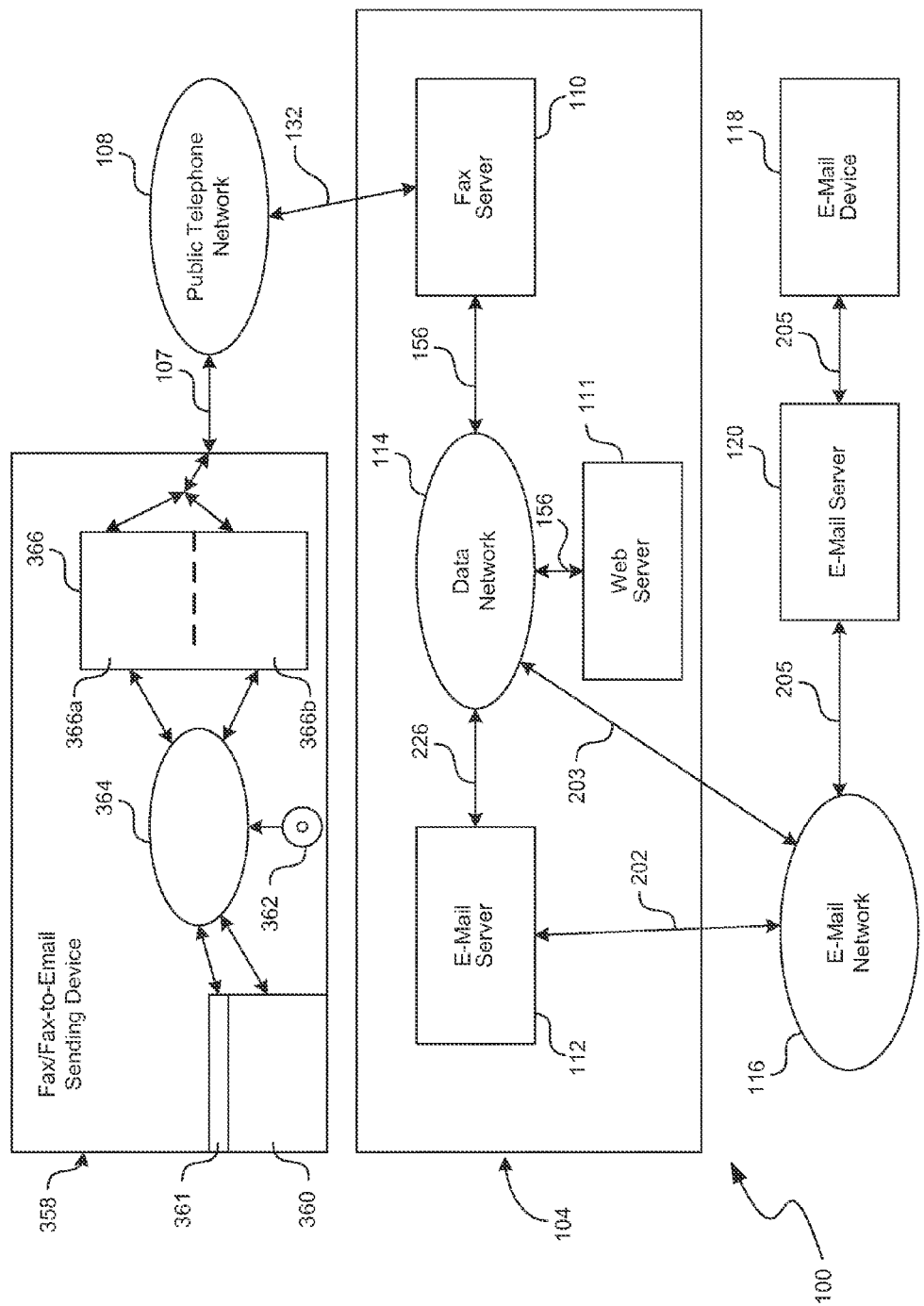
FIG. 15 is a schematic block diagram of a facsimile-to-electronic mail communication system according to an alternate embodiment of the present invention, including a combined unit fax/fax-to-e-mail sending device.

Whereas the present invention has been depicted and described in relationship to embodiments in which the fax interface device 102 and the fax device 106 are embodied in separate chassis interconnected by an accessory communication line 109, alternate embodiments of the facsimile-to-electronic mail communication system 100 of the present invention comprise a combined unit fax/fax-to E-mail sending device (hereinafter also identified as the "combined unit 358") which incorporates within a single chassis the functionality of both the fax interface device 102 and the fax device 106, with necessary component parts. In a first embodiment of such combined unit 102/106', the fax interface device 102 of the embodiment of FIG. 1 hereof, is simply physically embodied within a single chassis with the fax device 106 of the embodiment of FIG. 1, and necessary external modifications are made to the chassis in order to acquire access to the necessary keypads to effect operation of the two combined devices within the combined unit. In a preferred embodiment of the combined unit sending device, however, the functionality of the fax interface device 102 and the fax device 106 of the embodiment of FIG. 1 hereof are embodied within a single chassis and components which perform duplicate functions are eliminated to provide an efficiency of structure. With reference to FIG. 15, this preferred embodiment of the combined unit fax/fax-to-E-mail sending device 358 comprises a single keypad 360 and single display 361, which replace the two keypads and two displays of the fax interface device 102 and fax device 106 The keypad 360 of the combined unit 358 acts as a dual function keypad which accepts user input and interfaces with software logic 364 to alternately perform the functions of a standard fax device keypad or the functions of the fax interface device keypad 342. Preferably, the dual function keypad 342 includes all of the dial and function keys necessary to effect the functions of the fax device 106 and the fax interface device 102. A physical button (or command key) 362 which is software-enabled selectively switches the combined unit sending device 358 between a fax mode (during which the device functions as a standard fax machine delivering information from a hard copy document to a remote recipient fax machine) and a fax-to-E-mail mode (during which the information from a hard copy document is sent to its recipient via electronic mail, in accordance with previously discussed processes of the present invention). When switched to the fax mode, the dual function keypad 360 and display 361 receive and display keypad entries as a standard fax machine, and when the device 358 is in the fax-to-E-mail mode, the dual function keypad 360 and the display device 361 receive and display user keypad entries in a manner described previously in connection with the fax interface device 102. In the drawing of FIG. 15, the number 366 schematically represents the combined hardware/software functionality of the combined unit sending device 358 divided schematically into a fax interface device function 366a and a fax device function 366b. These functions are shown in this schematic manner to represent their separate functionality but their sharing of certain operational components. A user desiring to use the combined unit sending device 358 as a standard fax machine, depresses the command key button 362 to place the sending device in the fax mode, after which the user will enter digits at the keypad 360 which will be interpreted as standard facsimile machine keypad entries, resulting in the receipt and display of a telephone number which number will be sent (through operation of the combined units fax device function 36b) along communication line 107 to the public telephone network 108 to effect a telephone connection with a remote fax machine for fax-to-fax delivery of the hard copy information placed in the device. Other features and functionalities which are standard to typical prior art fax machines are acceptably provided. When the user desires to send a hard copy document to a recipient via electronic mail, the user depresses the command key button 362 to switch the combined unit sending device 358 to the fax-to-E-mail mode, in which mode the user entries at the dual function keypad 360 are interpreted in accordance with the prior described scheme of the present invention to input and display alphanumeric E-mail addresses. With reference to the prior disclosure, the combined unit sending device 358 operating through its fax interface device functionality 366a communicates with the FEM-GATEWAY 104 in a manner similar to the process described in connection with FIGS. 9A-9C previously. Once the "SEND" key is depressed on the keypad of the combined unit sending device 358 in response to the prompt at step 950 of FIG. 9C, the combined unit sending device switches to the fax device functionality 366b to deliver the fax image data along communication line 107 to the FEM-GATEWAY 104. The structure and functionality of the FEM-GATEWAY 104 is substantially similar to that previously described in connection with FIGS. 1-12 and the interactive processes of FIGS. 11A-11C are substantially as described previously. Furthermore, the remaining components (E-mail network 116, E-mail Server 120 and E-mail device 118) of the facsimile-to-E-mail communication system 100''' are substantially similar to those described in connection with the embodiment of FIGS. 1-12. Further explanation of the hardware and software-components of this combined unit fax/fax-to-E-mail sending device 358 is deemed unnecessary, as it will be readily understood by those skilled in the art having reference to the previous detailed descriptions of this specification.

Figure 16:
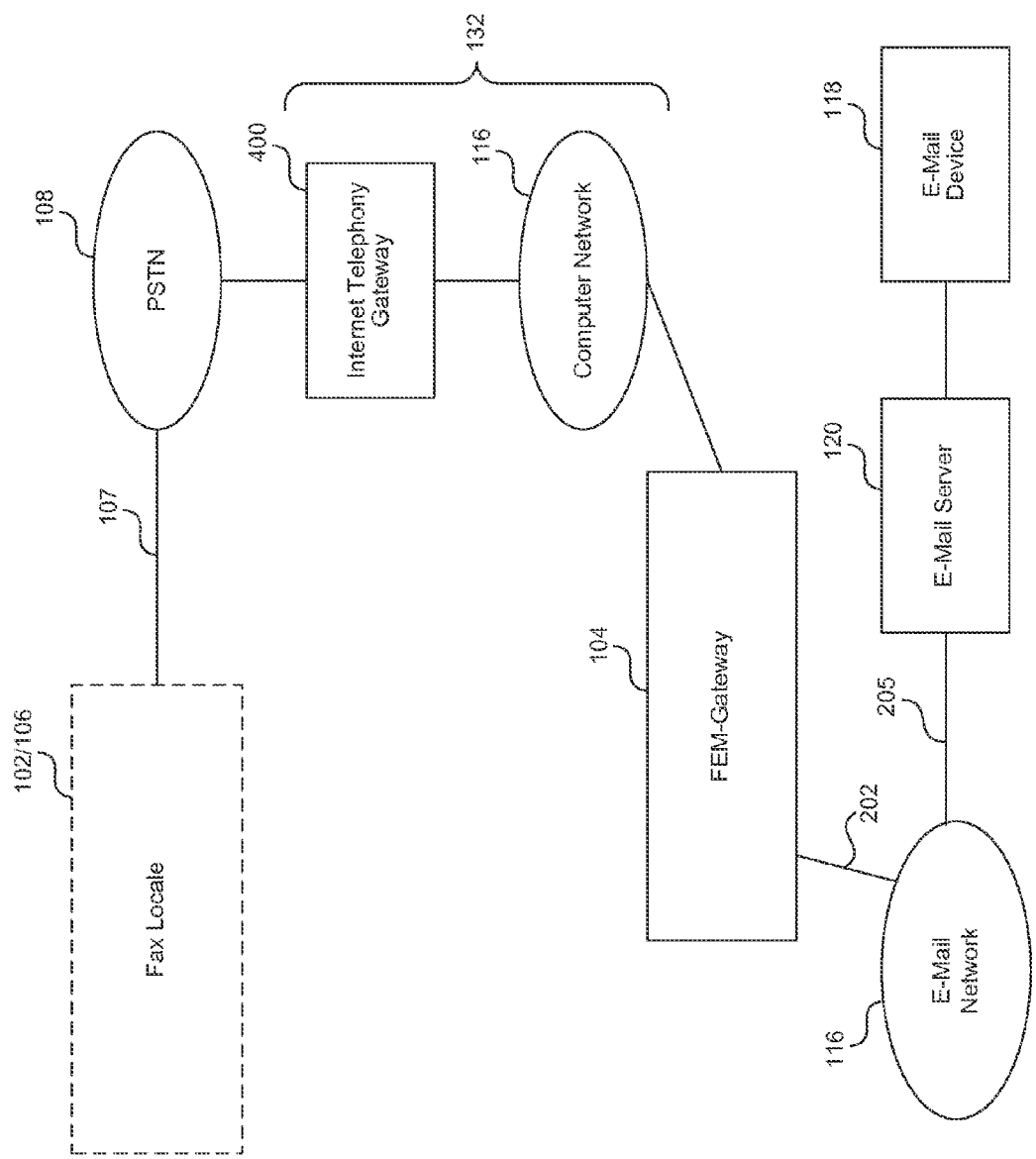
FIG. 16 is a schematic block diagram of a facsimile-to-electronic mail communication system according to the embodiments of FIGS. 1-14 and depicting an exemplary, alternate communication link.

It is understood that new and various communications techniques and systems are available and becoming available which communications techniques and systems are acceptably utilized to provide the "communication links" (e.g., link 132, link 202 , link 203, link 205) of the previously described preferred embodiments. By way of example, FIG. 16 depicts schematically an acceptable alternative communication link system 132' utilized as an acceptable communication link 132 between the PSTN 108 and the FEM-GATEWAY 104. The communication link system 132" includes what is commonly termed an "Internet Telephony Gateway" 400 and a computer network 116' (which is acceptably, though not necessarily, that same computer network described herein as the e-mail network 116). The Internet Telephony Gateway 400 is, for example, based on a gateway model currently developed by Dialogic Corporation of Parsippany, N.J. and VocalTec Communications. This Internet Telephony Gateway 400 functions, utilizing for example the developing protocol known as Voice Over Internet Protocol (VoIP), to bridge the circuit-switched PSTN 108 with the regional or global computer network 116' to which the FEM-SERVER 110 (FEM-GATEWAY 104) is connected as a server, and to, thereby, provide real time communication across the computer network 116' (e.g., the Internet) between the fax locale (e.g., devices 102, 106—generically depicted in FIG. 16) and the FEM-SERVER. Thus, the standard telephone and standard fax signals are communicated by the fax device 106 and/or fax interface device 102 (in accordance with one or more of the preferred embodiments discussed above) to the PSTN 108, which passes the signals to the Internet Telephony Gateway 400, which gateway digitizes the telephony signal, compresses it, packetizes it for the computer network (for example, the Internet using Internet Protocol), and routs it to the FEM-SERVER 110 over the computer network (e.g., Internet) 116'. The operation is reversed for packets being communicated from the FEM-SERVER 110 (in accordance with the above described preferred embodiments of the present invention) to the fax locale. Within the context of the broader scope of the present invention, the PSTN 108 and communication link system 132' (e.g., gateway 400 and computer network 116') function as a first communication network through which the fax locale (devices 102, 106) and the FEM-GATEWAY 104' communicate.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the present invention and that the scope of the present invention should only be limited by the claims below. Furthermore, the equivalents of all means-or-step-plus-function elements in the claims below are intended to include any structure, material, or acts for performing the function as specifically claimed and as would be understood by persons skilled in the art of this disclosure, without suggesting that any of the structure, material, or acts are more obvious by virtue of their association with other elements.

I claim:

1. A communications apparatus, comprising:
a facsimile component configured to generate facsimile information by scanning an image from a hard copy of a document;
a user interface configured to receive an e-mail address from a user;
a facsimile-to-e-mail gateway comprising a facsimile-to-e-mail component configured to—
in a first mode,
convert the facsimile information into a computer readable image file,
attach the computer readable image file to an e-mail message, and
transmit the e-mail message without additional user input to the received e-mail address, wherein the e-mail address is received in and interpreted from alphanumeric form; and
in a second mode,
transmit a facsimile device compatible file to a remote facsimile device; and
a housing configured to carry the user interface.

2. The communications apparatus of claim 1 wherein:
the facsimile component is configured to transmit the facsimile information via a first communications network; and
the facsimile-to-e-mail component is configured to transmit the e-mail message via a second communications network different than the first communications network.

3. The communications apparatus of claim 2 wherein:
the first communications network comprises at least one of a public switched telephone network, an Internet telephony network, a local area network, or a wide area network; and
the second communications network comprises a packet switched network.

4. The communications apparatus of claim 2 wherein, in the second mode, the facsimile-to-e-mail component is configured to receive data signals via the second communications network.

5. The communications apparatus of claim 2 wherein, in the second mode, the facsimile-to-e-mail component is configured to transmit the facsimile device compatible file via the second communications network.

6. The communications apparatus of claim 2 wherein, in the second mode, the facsimile-to-e-mail component is configured to transmit a confirmation facsimile file to the remote facsimile device via the first communications network.

7. The communications apparatus of claim 1 wherein the communication apparatus comprises a multi-function peripheral.

8. The communications apparatus of claim 1 wherein the user interface comprises an alphanumeric keypad.

9. The communications apparatus of claim 1 wherein the computer readable image file comprises a TIFF format image file.

10. The communications apparatus of claim 1 wherein the computer readable image file is in at least one of the following formats:
JPEG, GIF, PCX, DCX, BMP, PNG, or AWD.

11. The apparatus of claim 1 wherein the housing comprises a first housing, and wherein the apparatus further comprises a second housing configured to carry the facsimile-to-e-mail gateway.

12. A method of communicating information, the method comprising:
receiving facsimile image data and an e-mail address via a first communication network at a facsimile-to-e-mail gateway;
transmitting the received e-mail address from a first node to a second node of the facsimile-to-e-mail gateway without additional user input to the received e-mail address, the second node being in communication with and configured to provide a communication link between the first communication network and a computer network, wherein the e-mail address is received in and interpreted from an alphanumeric form;
issuing a prompt from the second node to the first node prompting for the transmission of the facsimile image data; and
after receiving the prompt by the first node from the second node, transmitting the facsimile image data from the first node to the second node,
wherein the second node selectively operates in a facsimile-to-data mode in which the second node converts the facsimile image data from a facsimile protocol format to image data in a second format.

13. The method of claim 12, further comprising transmitting the image data to an electronic mailbox on the computer network.

14. The method of claim 12 wherein receiving an e-mail address at the first node comprises:
prompting a user to input an e-mail address at the first node or to recall a previously stored e-mail address from memory; and
storing the input or recalled e-mail address in memory for future use.

15. The method of claim 12 wherein transmitting the image data in the second format comprises creating an e-mail message at the remote server, wherein the e-mail message is addressed to the received address, and further wherein the e-mail message includes the image data in the second format.

16. The method of claim 12, further comprising:
creating an information portion including delivery information and a comment receiving portion for a desired recipient; and
associating the image data in the second format with the information portion as an attachment.

17. The communications apparatus of claim 1 wherein the housing includes the facsimile component.

18. A communications apparatus, comprising:
a facsimile component configured to generate facsimile information by scanning an image from a hard copy of a document;
a user interface configured to receive an e-mail address from a user;
a housing configured to carry the user interface; and
a facsimile-to-e-mail gateway comprising a facsimile-to-e-mail component configured to—
in a first mode,
convert the facsimile information into a computer readable image file,
attach the computer readable image file to an e-mail message, and
transmit the e-mail message without additional user input to the received e-mail address; and
in a second mode,
transmit a facsimile device compatible file to a remote facsimile device;
wherein the facsimile-to-e-mail gateway comprises—
a fax server in communication with the facsimile component;
an e-mail server in communication with the remote facsimile device; and
a web server in communication with the fax server and the e-mail server,
wherein the fax server, the e-mail server and the web server are geographically separated.

19. A method of communicating information, the method comprising:
receiving facsimile image data and an e-mail address via a first communication network at a facsimile-to-e-mail gateway, wherein the facsimile-to-e-mail gateway comprises—
a fax server in communication with the facsimile component;
an e-mail server in communication with the remote facsimile device; and
a web server in communication with the fax server and the e-mail server,
and wherein the fax server, the e-mail server, and the web server are geographically separated;
transmitting the received e-mail address from a first node to a second node of the facsimile-to-e-mail gateway, the second node being in communication with and configured to provide a communication link between the first communication network and a computer network;
issuing a prompt from the second node to the first node prompting for the transmission of the facsimile image data; and
after receiving the prompt by the first node from the second node, transmitting the facsimile image data from the first node to the second node,
wherein the second node selectively operates in a facsimile-to-data mode in which the second node converts the facsimile image data from a facsimile protocol format to image data in a second format.

* * * * *